United States Patent
Abotabl et al.

(10) Patent No.: US 11,792,774 B2
(45) Date of Patent: Oct. 17, 2023

(54) FREQUENCY DOMAIN RESOURCE ALLOCATION TECHNIQUES FOR FULL DUPLEX COMMUNICATIONS

(71) Applicant: QUALCOMM Incorporated, San Diego, CA (US)

(72) Inventors: Ahmed Attia Abotabl, San Diego, CA (US); Gabi Sarkis, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/313,923

(22) Filed: May 6, 2021

(65) Prior Publication Data
US 2021/0352667 A1 Nov. 11, 2021

Related U.S. Application Data

(60) Provisional application No. 63/022,408, filed on May 8, 2020.

(51) Int. Cl.
*H04W 72/04* (2023.01)
*H04W 72/0446* (2023.01)
*H04L 5/14* (2006.01)
*H04W 72/23* (2023.01)

(52) U.S. Cl.
CPC ........... *H04W 72/0446* (2013.01); *H04L 5/14* (2013.01); *H04W 72/23* (2023.01)

(58) Field of Classification Search
CPC ........... H04W 72/0446; H04W 72/042; H04W 74/0825; H04W 72/044; H04W 74/082;
(Continued)

(56) References Cited

U.S. PATENT DOCUMENTS 8,358,982 B2 * 1/2013 Van Der Velde ............................ H04W 36/0088 455/67.11
2012/0113866 A1 5/2012 Tenny et al.
(Continued)

OTHER PUBLICATIONS

International Search Report and Written Opinion—PCT/US2021/031367—ISA/EPO—dated Jul. 13, 2021.
(Continued)

*Primary Examiner* — Wei Zhao
(74) *Attorney, Agent, or Firm* — Shumaker & Sieffert, PA

(57) ABSTRACT

Aspects of the disclosure relate to a downlink (DL) resource allocation feature in a wireless communication system, configured to address an issue that may arise in a sub-band full-duplex (SBFD) carrier (also sometimes called a flexible duplex carrier). For example, on an SBFD carrier, a slot may have a format where an uplink (UL) portion of the carrier is between two DL portions of the carrier. In a case where a scheduler operating in a New Radio (NR) network utilizes DL resource allocation of a particular type, it may arise that a portion of the DL allocation falls in the UL portion of the carrier. Accordingly, a scheduled entity may add the UL portion of the carrier to a set of resources that are indicated as not available for DL transmission. Other aspects, embodiments, and features are also claimed and described.

25 Claims, 17 Drawing Sheets

(58) Field of Classification Search
CPC ... H04L 5/0098; H04L 5/0053; H04L 5/0094; H04L 5/14; H04L 25/03006; H04L 25/03
See application file for complete search history.

(56) References Cited

U.S. PATENT DOCUMENTS

| | | | |
|---|---|---|---|
| 2013/0294318 A1 | 11/2013 | Amerga et al. | |
| 2019/0053227 A1* | 2/2019 | Huang | H04W 72/0446 |
| 2020/0351801 A1* | 11/2020 | Jeon | H04W 52/48 |

OTHER PUBLICATIONS

Panasonic: "Discussion on NR Duplexing", 3GPP TSG RAN WG1 Meeting #86bis, 3GPP Draft, R1-1609704, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 1, 2016, Oct. 9, 2016 (Oct. 9, 2016), 4 Pages, Oct. 10, 2016, XP051149738, Retrieved from the Internet: URL: http://www.3gpp.org/ftp/Meetings_3GPP_SYNC/RAN1/Docs/ [retrieved on Oct. 9, 2016] section 2.

LG Electronics: "Discussion on MRTD and MTTD in Dual Connectivity", 3GPP Draft, 3GPP TSG-RAN WG4 Meeting #84bis, R4-1710616 Discussion on MRTD and MTTD in Dual Connectivity, 3rd Generation Partnership Project (3GPP), Mobile Competence Centre, 650, Route Des Lucioles, F-06921 Sophia-Antipolis Cedex, vol. RAN WG4, No. Dubrovnik, Croatia, Oct. 9, 2017-Oct. 13, 2017, Oct. 8, 2017 (Oct. 8, 2017), 2 Pages, XP051345432, Retrieved from the Internet: URL: http://www.3gpp.org/ftp/Meetings_3GPP_SYNC/RAN4/Docs/ [retrieved on Oct. 8, 2017] section 2.

* cited by examiner

FREQUENCY DOMAIN RESOURCE ALLOCATION TECHNIQUES FOR FULL DUPLEX COMMUNICATIONS

PRIORITY CLAIM

This application claims priority to and the benefit of Provisional Patent Application No. 63/022,408, filed in the United States Patent and Trademark Office (USPTO) on May 8, 2020, the entire content of which is incorporated herein by reference as if fully set forth below in its entirety and for all applicable purposes.

TECHNICAL FIELD

The technology discussed below relates generally to wireless communication systems, and more particularly, to resource allocation (e.g., frequency allocation in a slot, such as a sub-band full-duplex (SBFD) slot). Some aspects may include enabling and providing communication devices and methods configured to mitigate and/or resolve potential conflicts between a slot, having a particular slot format, and a downlink (DL) resource allocation for that slot to help address and mitigate potential interference scenarios improving device performance and system throughput.

INTRODUCTION

In wireless communication, a full-duplex link is one where both endpoints can simultaneously communicate with one another on the same set of resources. Many wireless communication systems provide for full-duplex emulation, with simultaneous communication in both directions between respective endpoints, but with the different-direction transmissions using different sets of resources. For example, time division duplex (TDD) provides for transmissions in different directions on a given channel to be separated from one another using time division multiplexing. That is, at some times the channel is dedicated for transmissions in one direction, while at other times the channel is dedicated for transmissions in the other direction. In another example, frequency division duplex (FDD) provides for transmissions in different directions to operate at different carrier frequencies.

In a wireless communication system utilizing orthogonal frequency division multiplexing (OFDM), a duplexing scheme often called sub-band full-duplex (SBFD) may be used. SBFD differs from conventional FDD in that in FDD, a given carrier is typically fully dedicated either for uplink or downlink communication. With SBFD, a portion of the time-frequency resources on a given carrier are dedicated for uplink, and a portion of the time-frequency resources on that same carrier support downlink. Accordingly, an endpoint communicating utilizing SBFD transmits and receives at the same time, but on different frequency resources of the same carrier. That is, the downlink resource is separated from the uplink resource in the frequency domain.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description presented later.

In various aspects, the present disclosure provides for a downlink (DL) resource allocation feature in a wireless communication system, configured to address an issue that may arise in a sub-band full-duplex (SBFD) carrier (also sometimes called a flexible duplex carrier). For example, on an SBFD carrier, a slot may have a format where an uplink (UL) portion of the slot is located between multiple DL portions of the slot (in frequency). When a scheduler operating in a 3GPP New Radio (NR) network utilizes DL resource allocation of a particular type (e.g., type 1), it may arise that a portion of the DL resource allocation overlaps with (e.g., falls in) the UL portion of the slot.

In some examples, a user equipment (e.g., a mobile device) may communicate with a scheduling entity, such as a base station (BS). These devices may communicate over a wireless carrier (e.g., an SBFD carrier) by transmitting, on the wireless carrier, to one another one or more slots having a particular slot format. The slot format, for example, may correspond to a configuration of resources (e.g., a set of resource elements (REs)) in the one or more slots. The resources may be designated as being for communication in one direction for transmitting data over the wireless carrier (e.g., in an uplink portion of the slot) or utilized for communication in the other direction for receiving data over the wireless carrier (e.g., in a downlink portion of the slot).

In some examples, a scheduling entity may transmit a DL resource allocation to a user equipment (e.g., a mobile device). The DL resource allocation may include a schedule or grant message that identifies a set of resources for facilitating communication between the user equipment and the scheduling entity over the wireless carrier. In some instances, the resources in the DL resource allocation may include a set of resources corresponding to portions of the slot that have been allocated for DL communication (e.g., as determined based on the slot format of the slot). However, the set of resources in the DL resource allocation may further include, in some instances, at least some resources allocated for UL communication. In such instances, the one or more resources identified in the DL resource allocation that include resources allocated for UL communication form an overlapping portion within the slot of resources. If unmitigated, according to one or more of the various techniques of this disclosure, information corresponding to resources in the overlapping portion may conflict (e.g., interfere) with information being transmitted in the opposite direction using the same resource in the overlapping portion.

According to one or more of the various techniques of this disclosure, a user equipment (UE) may add the UL portion of the carrier to a set of resources indicated as not available (i.e., unavailable) for DL transmission. In such instances, the UE may receive a DL resource allocation (e.g., a grant message) that overlaps (fully or partially) with the UL portion (in frequency). In such instances, the UE may determine to disregard information related to the particular portion of the DL resource allocation that overlaps with the UL portion since the UL portion of the carrier is indicated as not being available for DL transmissions.

Some aspects of the disclosure provide a method of wireless communication operable at a scheduled entity (e.g., a UE). In a more particular example, the method includes receiving information indicating a slot format, the information identifying a first frequency portion of a slot for uplink (UL) communication and at least one other portion of the slot for downlink (DL) communication. The method further includes receiving a DL resource allocation for the slot, the DL resource allocation comprising an overlapping portion where at least a portion of the DL resource allocation overlaps with at least a portion of the first frequency portion of the slot. In some examples, the method may further include determining that the overlapping portion comprises resources unavailable for DL transmission. The method further includes communicating over a wireless carrier utilizing the slot format while disregarding (e.g., ignoring, forgoing to process, etc.) information related to the overlapping portion.

Further aspects of the disclosure provide an apparatus for wireless communication. In a more particular example, the apparatus includes means for receiving information indicating a slot format, the information identifying a first frequency portion of a slot for uplink (UL) communication and at least one other portion of the slot for downlink (DL) communication. The apparatus further includes means for receiving a DL resource allocation for the slot, the DL resource allocation comprising an overlapping portion where at least a portion of the DL resource allocation overlaps with at least a portion of the first frequency portion of the slot. In some examples, the apparatus may further include means for determining that the overlapping portion comprises resources unavailable for DL transmission. The apparatus further includes means for communicating over a wireless carrier utilizing the slot format while disregarding information related to the overlapping portion.

Further aspects of the disclosure provide a non-transitory computer-readable medium storing computer-executable code. In a more particular example, the code includes instructions for causing a user equipment (UE) to receive information indicating a slot format, the information identifying a first frequency portion of a slot for uplink (UL) communication and at least one other portion of the slot for downlink (DL) communication. The code further includes instructions for causing the UE to receive a DL resource allocation for the slot, the DL resource allocation comprising an overlapping portion where at least a portion of the downlink resource allocation overlaps with at least a portion of the first frequency portion of the slot. In some examples, the code may include instructions for causing the UE to determine that the overlapping portion comprises resources unavailable for DL transmission. The code further includes instructions for causing the UE to communicate over a wireless carrier utilizing the slot format while disregarding information received in the overlapping portion.

Still further aspects of the disclosure provide an apparatus for wireless communication. In a more particular example, the apparatus includes a processor, a transceiver communicatively coupled to the processor, and a memory communicatively coupled to the processor. The processor and the memory are configured to receive information indicating a slot format, the information identifying a first frequency portion of a slot for uplink (UL) communication and at least one other frequency portion of the slot for downlink (DL) communication. The processor and the memory are further configured to receive, via the transceiver, a DL resource allocation for the slot, the DL resource allocation comprising an overlapping portion where at least a portion of the DL resource allocation overlaps with at least a portion of the first frequency portion of the slot. In some examples, the processor and the memory may be further configured to determine that the overlapping portion comprises resources unavailable for DL transmission. The processor and the memory are further configured to communicate, via the transceiver, over a wireless carrier utilizing the slot format while disregarding information related to the overlapping portion.

Some aspects of the disclosure provide a method of wireless communication operable at a scheduling entity (e.g., a base station (BS)). In a more particular example, the method includes determining at least one first frequency portion of a slot as being available for uplink (UL) communication, and at least one second frequency portion of the slot as being available for downlink (DL) communication, wherein the at least one first frequency portion of the slot is unavailable for DL communication. The method further includes transmitting, via the transceiver, information indicative of the at least one first frequency portion of the slot and the at least one second frequency portion of the slot. The method further includes transmitting a DL resource allocation to a user equipment (UE), the DL resource allocation comprising an overlapping portion where the DL resource allocation overlaps at least partially with the at least one first frequency portion of the slot. The method further includes utilizing the slot to communicate over a wireless carrier with the UE.

Still further aspects of the disclosure provide an apparatus for wireless communication. In a more particular example, the apparatus includes a processor, a transceiver communicatively coupled to the processor, and a memory communicatively coupled to the processor. The processor and the memory are configured to determine at least one first frequency portion of a slot as being available for uplink (UL) communication, and at least one second frequency portion of the slot as being available for downlink (DL) communication, wherein the at least one first frequency portion of the slot is unavailable for DL communication. The processor and the memory are further configured to transmit, via the transceiver, information indicative of the at least one first frequency portion of the slot and the at least one second frequency portion of the slot. The processor and the memory are further configured to transmit a DL resource allocation to a user equipment (UE), the DL resource allocation comprising an overlapping portion where the DL resource allocation overlaps at least partially with the at least one first frequency portion of the slot. The processor and the memory are further configured to utilize the slot to communicate over a wireless carrier with the UE.

These and other aspects of the technology discussed herein will become more fully understood upon a review of the detailed description, which follows. Other aspects, features, and examples will become apparent to those skilled in the art upon reviewing the following description of certain examples in conjunction with the accompanying figures. While the following description may discuss various advantages and features relative to certain embodiments and figures, all embodiments can include one or more of the advantageous features discussed herein. In other words, while this description may discuss one or more examples as having certain advantageous features, one or more of such features may also be used in accordance with the various examples discussed herein. In similar fashion, while this description may discuss exemplary embodiments as device, system, or method embodiments, it should be understood

DETAILED DESCRIPTION

Figure 1:
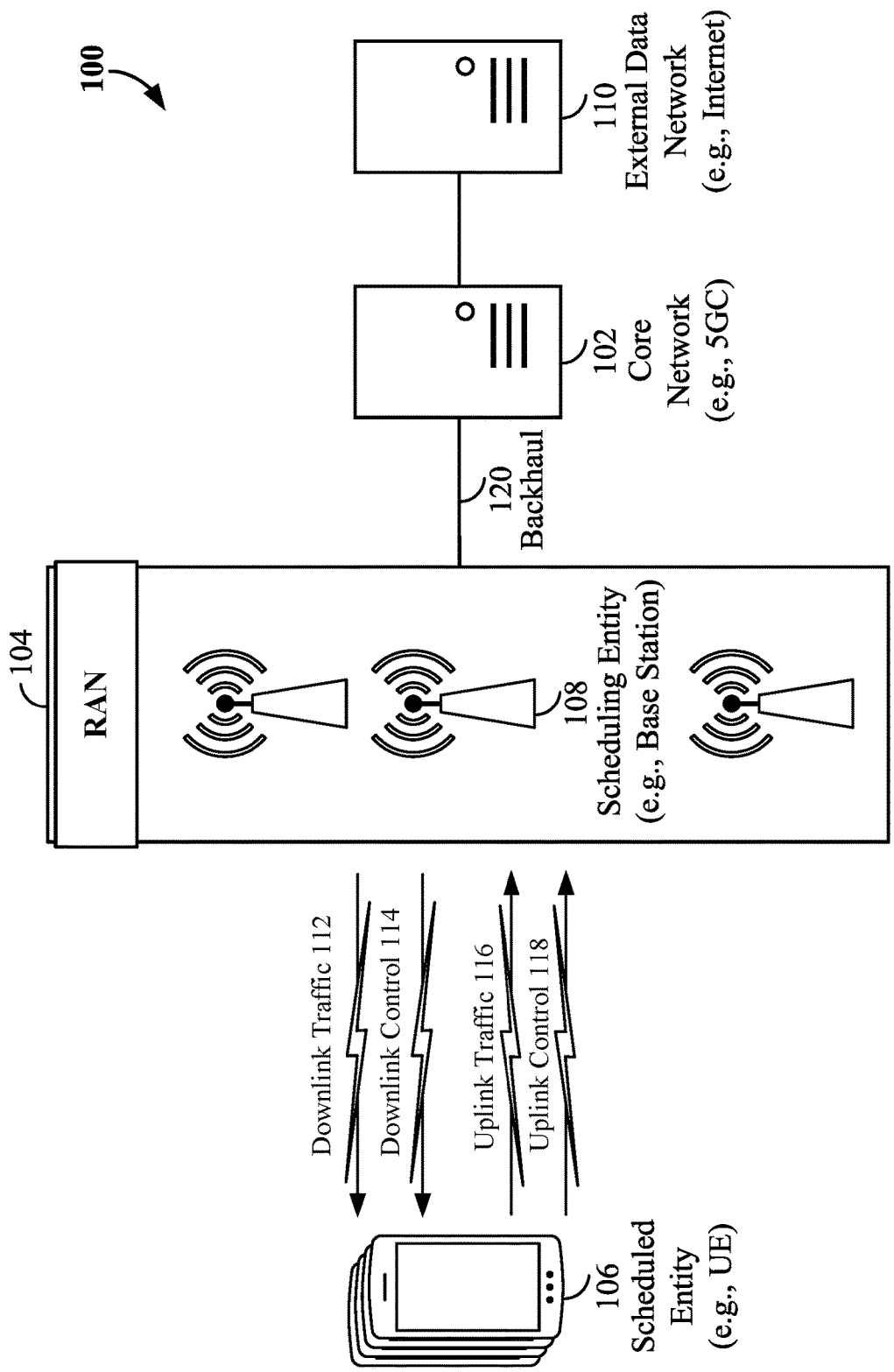
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, and/or packaging arrangements. In an example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. In an example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, aggregated or dis-aggregated, end-user devices, etc. of varying sizes, shapes and constitution.

Techniques presented herein aim to aid and/or resolve resource allocation and/or usage conflicts. In some aspects, the present disclosure provides several approaches and features configured to resolve potential or actual conflicts in frequency allocation. These may arise, for example, in scenarios involving a Type 1 frequency domain resource allocation in sub-band full-duplex (SBFD). In some scenarios, allocated downlink resources may overlap with resources that a slot format has designated for uplink communication. By addressing this overlap, as discussed herein, communication device performance and system throughput are improved.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and at least one scheduled entity 106 (e.g., at least one user equipment (UE)). By virtue of the wireless communication system 100, the at least one scheduled entity 106 may be enabled to carry out data communication with an external data network 110, such as (but not limited to) the Internet.

The RAN 104 may implement any suitable wireless communication technology or technologies to facilitate communication between a scheduled entity 106 and a scheduling entity 108 (e.g., by providing radio access to a scheduled entity 106). In an example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

NR access may support various wireless communication services. This can include enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated, the RAN 104 includes at least one scheduling entity 108, where, in some examples, the scheduling entity 108 may be a base station (BS). Broadly, a BS is a network element in a RAN that provides radio transmission and reception in one or more cells to or from a scheduled entity 106 (e.g., a UE). In different technologies, standards, or contexts, those skilled in the art may variously refer to a 'base station' as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or for relevant quality of service (QoS) for transport of critical service data.

Wireless communication between the RAN 104 and a scheduled entity 106 (e.g., a UE) may be described as utilizing an air interface. Transmissions over the air interface from a scheduling entity 108 (e.g., a BS, a UE, etc.) to a scheduled entity 106 (e.g., one or more UEs) may be referred to as downlink (DL) transmissions. In accordance with certain aspects of the present disclosure, the term "downlink" may refer to a point-to-multipoint transmission originating at a scheduling entity 108). Another way to describe this scheme may be to use the term broadcast channel multiplexing. Transmissions from a scheduled entity 106 to a scheduling entity 108, on the other hand, may be referred to as uplink (UL) transmissions. In accordance with further aspects of the present disclosure, the term "uplink" may refer to a point-to-point transmission originating at a scheduled entity 106. As illustrated in FIG. 1, a scheduling entity 108 may manage DL traffic 112 to one or more scheduled entities 106, and UL traffic 116 from one or more scheduled entities 106.

In some examples, access to the air interface may be scheduled. This can include scenarios where a scheduling entity 108 allocates wireless resources for communication among some or all devices and equipment within a cell (e.g., a service area of the scheduling entity 108). Within the present disclosure, a scheduling entity 108 may be responsible for scheduling, assigning, reconfiguring, and releasing resources for one or more scheduled entities 106. That is, for scheduled communication, scheduled entities 106 utilize resources allocated by a scheduling entity 108. In an example, the scheduled entities 106 may include entities scheduled for communication (e.g., UEs) that are configured to utilize resources allocated by the scheduling entity 108.

It should be noted that BSs are not the only entities that may function as scheduling entities. That is, in some examples, a UE may function as a scheduling entity 108. A UE, as such, may be configured to schedule resources for one or more scheduled entities (e.g., one or more other UEs) in wireless communication system 100.

As illustrated in FIG. 1, a scheduling entity 108 may broadcast DL traffic 112 to one or more scheduled entities 106. Broadly, the scheduling entity 108 is a node or device responsible for scheduling traffic in a wireless communication network, including the DL traffic 112 and, in some examples, UL traffic 116 from one or more scheduled entities 106 to the scheduling entity 108. On the other hand, the scheduled entity 106 is a node or device that receives DL control information (DCI) 114, including but not limited to scheduling information (e.g., a grant), synchronization or timing information, or other control information from another entity in the wireless communication network (e.g., from a scheduling entity 108). In an example, the scheduled entity 106 may receive a DL resource allocation for a slot and determine that a portion of the DL resource allocation overlaps in frequency (e.g., fully or partially) with resources designated as unavailable for DL transmission.

In general, a scheduling entity 108 (e.g., one or more base stations (BSs)) may include a backhaul interface for communication with a backhaul 120 of the wireless communication system 100. The backhaul 120 may provide a link between a scheduling entity 108 (e.g., a BS) and a network 102. Further, in some examples, a backhaul 120 may provide interconnection between multiple scheduling entities 108 (e.g., a first BS and a second BS, etc.). Various types of interfaces for the backhaul 120 may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to NR specifications (e.g., 5GC). In another example, the core network 102 may be configured according to a 4G evolved packet core (EPC), or any other suitable standard or configuration.

It should be noted that the techniques described herein may be used for various wireless networks and radio technologies. While some aspects of the present disclosure may be described using terminology commonly associated with 3G, 4G, and/or new radio (e.g., 5G NR) wireless technologies, aspects of the disclosed technology can be applied in other generation-based communication systems as would be understood by a person skilled in the art.

In general, any number of wireless networks may be deployed in a given geographic area. Each wireless network may support a particular radio access technology (RAT) and may operate on one or more frequencies. Those skilled in the art may variously refer to a RAT as a radio technology, an air interface, etc. Those skilled in the art may further refer to a frequency as a carrier, a subcarrier, a frequency channel, a component carrier, a tone, a subband, etc. Each frequency may support a single RAT in a given geographic area in order to avoid interference between wireless networks of different RATs.

Figure 2:
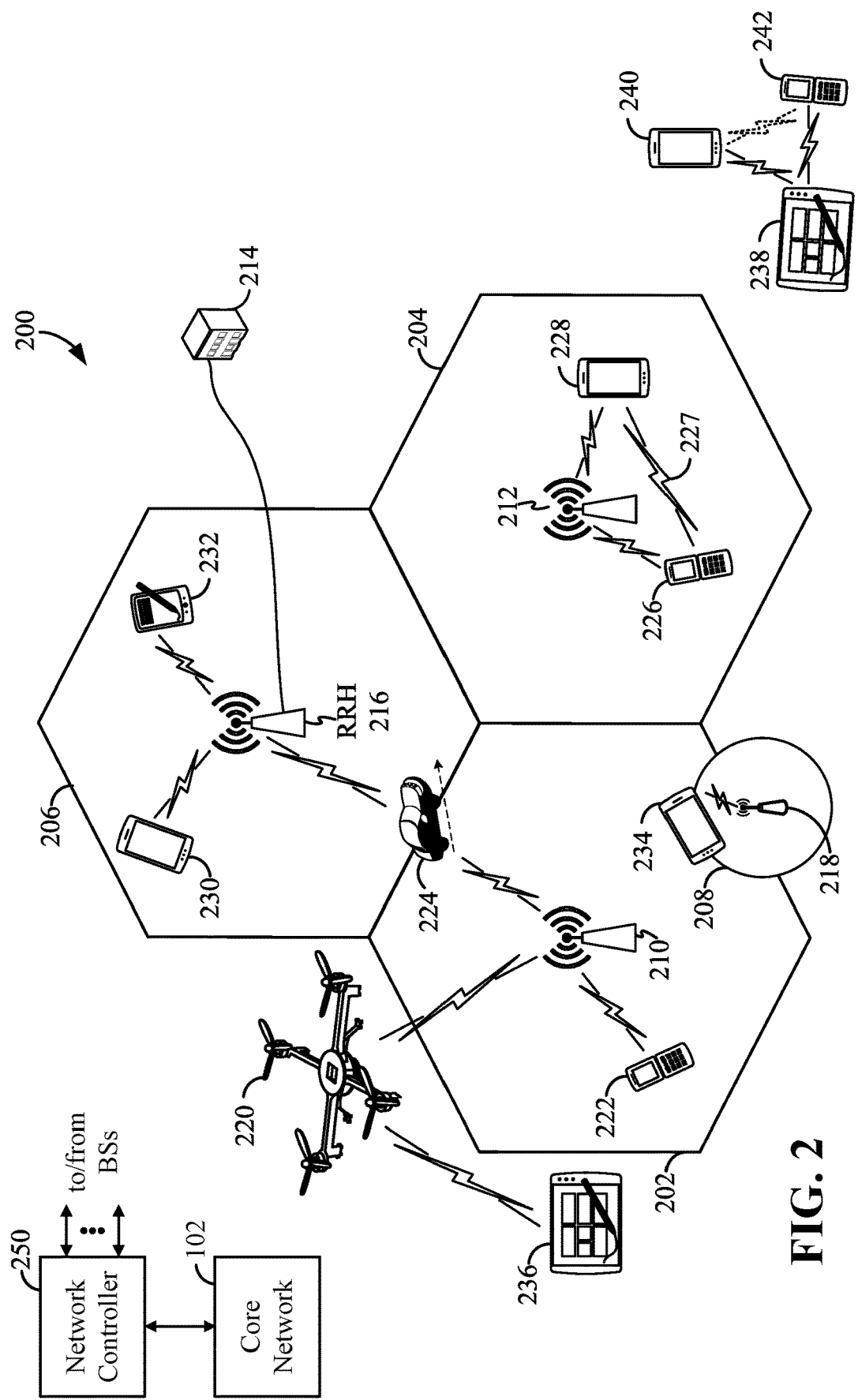
FIG. 2 is a conceptual illustration of an example of a radio access network (RAN) according to some embodiments.

FIG. 2 provides a schematic illustration of a RAN 200, by way of example and without limitation. In some examples, the RAN 200 may be the same as the RAN 104 described, for example, with reference to FIG. 1. For example, the RAN 200 may be an NR system (e.g., a 5G NR network). The RAN 200 may be in communication with a core network 102. The core network 102 may be in communication with one or more BSs 210, 212, 214, and/or 218 and/or UEs 222, 224, 226, 228, 230, 232, 234, 236, 238, 240, and/or 242 in the RAN 200 via one or more interfaces.

The geographic area covered by the RAN 200 may be divided into cellular regions (cells) that a user equipment (UE) can uniquely identify based on an identification broadcasted from one access point or base station (BS). FIG. 2 illustrates macrocells 202, 204, and 206, and a small cell 208, each of which may include one or more sectors (not shown). A sector is a sub-area of a cell. All sectors within one cell are served by the same BS. A radio link within a sector can be identified by a single logical identification belonging to that sector. In a cell that is divided into sectors, the multiple sectors within a cell can be formed by antennas with each antenna responsible for communication with UEs in a portion of the cell.

FIG. 2 shows two base stations (BSs) 210 and 212 in cells 202 and 204; and shows a third base station 214 controlling a remote radio head (RRH) 216 in cell 206. That is, a BS can have an integrated antenna or can be connected to an antenna or RRH by feeder cables. In the illustrated example, the cells 202, 204, and 206 may be referred to as macro cells, as the BSs 210, 212, and 214 support cells having a large size. Further, a BS 218 is shown in the small cell 208 (e.g., a micro cell, pico cell, femto cell, home base station, home Node B, home eNode B, etc.) which may overlap with one or more macro cells. In this example, the cell 208 may be referred to as a small cell, as the BS 218 supports a cell having a relatively small size. Cell sizing can be done according to system design as well as component constraints.

The RAN 200 may include any number of wireless BSs and cells. Further, a RAN may include a relay node to extend the size or coverage area of a given cell. The BSs 210, 212, 214, 218 provide wireless access points to a core network 102 for any number of mobile apparatuses. In some examples, the BSs 210, 212, 214, and/or 218 may be the same as the scheduling entity 108 described with reference to FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each BS 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with BS 214 by way of the RRH 216; UE 234 may be in communication with BS 218; and UE 236 may be in communication with mobile BS 220. In some examples, the UEs 222, 224, 226, 228, 230, 232, 234, 236, 238, 240, and/or 242 may be the same as the scheduled entity 106 described, for example, with reference to FIG. 1.

In some examples, a mobile network node (e.g., a quadcopter 220) may be configured to function as a UE. For example, the quadcopter 220 may operate within the cell 202 by communicating with BS 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a BS (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system 100 with scheduled access to time-frequency resources and having a cellular configuration, a P2P configuration, or a mesh configuration, a scheduling entity and one or more scheduled entities may communicate utilizing the scheduled resources.

The air interface in the RAN 200 may utilize one or more multiplexing and multiple access algorithms to enable simultaneous communication of the various devices. For example, 5G NR specifications provide multiple access for UL transmissions from a UE 222 and a UE 224 to a base station (BS) 210, and for multiplexing for DL transmissions from a BS 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to such schemes. For example, a UE may provide for UL multiple access utilizing time division multiple access (TDMA), time division synchronous code division multiple access (TD-SCDMA), code division multiple access (CDMA), frequency division multiple access (FDMA), sparse code multiple access (SCMA), resource spread multiple access (RSMA), or other suitable multiple access schemes. Further, a BS 210 may multiplex DL transmissions to UEs 222 and 224 utilizing time division multiplexing (TDM), code division multiplexing (CDM), frequency division multiplexing (FDM), OFDM, sparse code multiplexing (SCM), or other suitable multiplexing schemes.

In some examples, a network controller 250 may be in communication with a set of BSs 210, 212, 214, and/or 218 and provide coordination and control for these BSs 210 (e.g., via backhaul 120). In certain aspects, the network controller 250 may be in communication with a core network 102 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In some examples, the scheduled entity 106 (e.g., a UE) may receive, from a scheduling entity 108 (e.g., a BS), a DL resource allocation. The scheduled entity 106 may communicate with the scheduling entity 108 (e.g., via an air interface in the RAN 200) while disregarding (e.g., ignoring) at least some information of the DL resource allocation due to portions of the DL resource allocation falling within portions of a carrier designated as unavailable for DL transmission.

Figure 3:
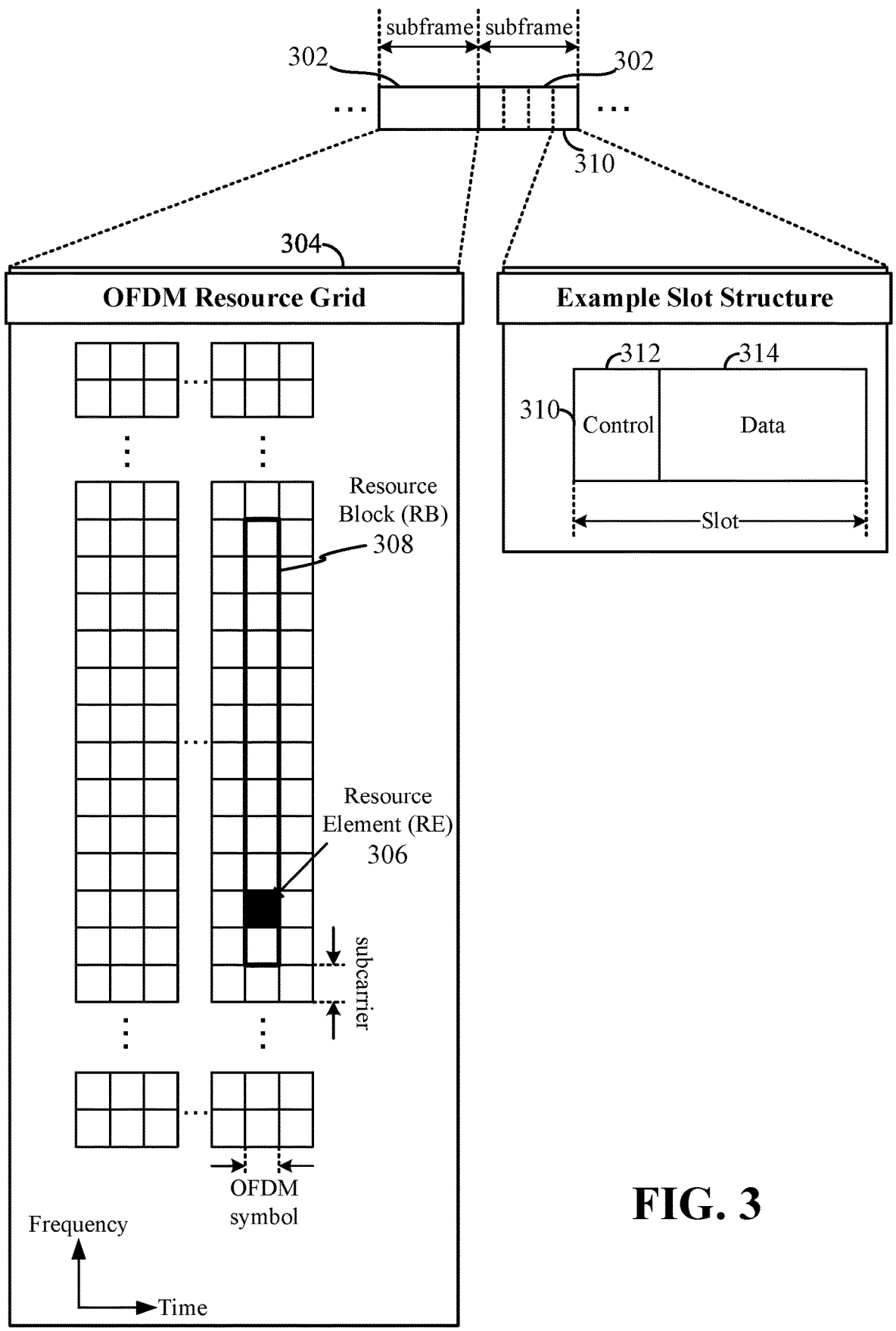
FIG. 3 is a schematic illustration of an organization of wireless resources in an air interface utilizing orthogonal frequency divisional multiplexing (OFDM) according to some embodiments.

FIG. 3 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein. That is, while some examples of the present disclosure may focus on an OFDM link for clarity, the present disclosure is not so limited, and a person of ordinary skill in the art will understood that one or more of the various techniques of this disclosure may also be applied to, for example, DFT-s-OFDMA waveforms, as well.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 3 illustrates an expanded view of an exemplary DL subframe 302, showing an OFDM resource grid 304. However, as those skilled in the art will readily appreciate, the PHY transmission structure for any particular application may vary from the example described here, depending on any number of factors. Here, time is in the horizontal direction with units of OFDM symbols. Frequency is in the vertical direction with units of subcarriers or tones.

The resource grid 304 may schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In an illustrative and non-limiting example, an RB may include twelve subcarriers (REs), a number independent of the numerology used. In some examples, depending on the numerology, an RB may include any suitable number of consecutive OFDM symbols in, for example, the time domain.

A scheduled entity 106 generally utilizes only a subset of the resource grid 304. An RB may be the smallest unit of resources that can be allocated to a scheduled entity 106. Thus, the more RBs scheduled for a scheduled entity 106, and the higher the modulation scheme chosen for the air interface, the higher the data rate for the scheduled entity 106.

In this illustration, the RB 308 occupies less than the entire bandwidth of the subframe 302, with some subcarriers illustrated above and below the RB 308. In a given implementation, the subframe 302 may have a bandwidth corresponding to any number of one or more RBs 308. Further, the RB 308 is shown occupying less than the entire duration of the subframe 302, although this is merely one possible example.

Subframes may have a variety of features that may be configurable. In some examples, subframes may have a fixed duration or length or configurable duration or length. In some examples, a subframe can be 1 ms. In some scenarios, each 1 ms subframe 302 may consist of one or multiple adjacent slots (e.g., a series of consecutive slots). In FIG. 3, one subframe 302 includes four slots 310, as an illustrative example. In some examples, a slot may be defined according to a specified number of OFDM symbols with a given CP length. For example, a slot may include 7 or 14 OFDM symbols with a nominal CP. Additional examples may include mini-slots having a shorter duration (e.g., one or two OFDM symbols). A scheduling entity may in some cases transmit these mini-slots occupying resources scheduled for ongoing slot transmissions for the same or for different UEs.

An expanded view of one of the slots 310 illustrates the slot 310 including a control region 312 and a data region 314. In general, the control region 312 may carry control channels (e.g., a physical downlink control channel (PDCCH) and/or a physical uplink control channel (PUCCH)), and the data region 314 may carry data channels (e.g., a physical downlink shared channel (PDSCH) and/or a physical uplink shared channel (PUSCH)). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may carry one or more physical channels, including control channels, shared channels, data channels, etc. Other REs 306 within the RB 308 may also carry pilots or reference signals (RSs). These pilots or RSs may provide for a receiving device (e.g., a UE) to perform channel estimation of the corresponding channel, which, in some examples, may enable coherent demodulation/detection of the control and/or data channels within the RB 308.

In a DL transmission, the transmitting device (e.g., a scheduling entity 108) may allocate one or more REs 306 (e.g., within a control region 312) to carry one or more DL control channels. These DL control channels include DCI 114 that generally carries information originating from higher layers, such as a physical broadcast channel (PBCH), a PDCCH, etc., to one or more scheduled entities 106. The PDCCH may carry DCI 114 for one or more UEs in a cell. This can include, but is not limited to, power control commands, scheduling information, a grant, and/or an assignment of REs for DL and UL communications.

In some examples, the transmitting device may allocate one or more DL REs to carry DL physical signals that generally do not carry information originating from higher layers. These DL physical signals may include a primary synchronization signal (PSS), a secondary synchronization signal (SSS), demodulation reference signals (DM-RSs), phase-tracking reference signals (PT-RSs), CSI reference signals (CSI-RSs), etc. In such examples, DL resources may be allocated to carry such DL physical signals.

A scheduling entity 108 may transmit the synchronization signals (e.g., a PSS and an SSS, collectively referred to as SSs), and in some examples, the PBCH in an SS block that includes four consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. It should be noted that while the present disclosure, at times, may refer to one or more specific SS block configurations as illustrative examples, the present disclosure is not so limited, and a person of ordinary skill in the art will understand that other example configuration may also apply according to one or more of the various techniques disclosed herein. To illustrate, additional, or alternative, examples may utilize greater or fewer than two synchronization signals, may include one or more supplemental channels in addition to the PBCH, may omit a PBCH, and/or may utilize nonconsecutive symbols for an SS block, to name but a few examples.

For UL communication, a transmitting device (e.g., a scheduled entity 106) may utilize one or more REs 306 to carry one or more UL control channels, such as a physical uplink control channel (PUCCH), aphysical random access channel (PRACH), etc. These UL control channels include UL control information (UCI) 118 that generally carries information originating from higher layers. Further, UL REs may carry UL physical signals that generally do not carry information originating from higher layers, such as demodulation reference signals (DM-RSs), phase-tracking reference signals (PT-RSs), sounding reference signals (SRSs), etc. In some examples, the UCI 118 may include a scheduling request (SR) (e.g., a request for the scheduling entity 108 to schedule UL transmissions). In such examples, the scheduling entity 108 may, in response to receiving the SR transmitted on the control channel, transmit DCI 114 that may schedule resources for UL packet transmissions.

The UCI 118 may also include hybrid automatic repeat request (HARQ) feedback such as an acknowledgment (ACK) or negative acknowledgment (NACK), channel state information (CSI), or any other suitable UCI. HARQ is a technique well-known to those in the art, wherein a receiving device may check the integrity of packet transmissions at the receiving side for accuracy, e.g., utilizing any suitable integrity checking mechanism, such as a checksum or a cyclic redundancy check (CRC). If the receiving device (e.g., a UE) confirms the integrity of the transmission, it may transmit an ACK to the transmitting device (e.g., a scheduling entity 108). If the integrity of the transmission is not confirmed, the receiving device may transmit a NACK to the transmitting device. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels (e.g., an SBFD wireless carrier), such as, for a DL transmission, a PDSCH (e.g., DL traffic 112); or for a UL transmission, a PUSCH (e.g., UL traffic 116).

For a scheduled entity 106 to gain initial access to a cell, the RAN may provide system information (SI) characterizing the cell. The RAN may provide this SI utilizing minimum system information (MSI), and other system information (OSI). The RAN may periodically broadcast the MSI over the cell to provide the most basic information a scheduled entity 106 requires for initial cell access, and for enabling a scheduled entity 106 to acquire any OSI that the RAN may broadcast periodically or send on-demand. In some examples, a network may provide MSI over two different DL channels. For example, the PBCH may carry a master information block (MIB), and the PDSCH may carry an SI block type 1 (SIB1). Here, the MIB may provide a UE with parameters for monitoring a control resource set. The control resource set may thereby provide the UE with scheduling information corresponding to the PDSCH, e.g., a resource location of SIB1. Those skilled in the art variously refer to SIB1 as remaining minimum system information (RMSI).

In some examples, OSI may include any SI that is not broadcast in the MSI. In some examples, the PDSCH may carry a plurality of SIBs, not limited to SIB1. Here, the RAN may provide the OSI in these SIBs, e.g., SIB2 and above.

The channels or carriers described herein and illustrated in FIGS. 1 and/or 3 are not necessarily all the channels or carriers that may be utilized between a scheduling entity 108 and scheduled entities 106. Those of ordinary skill in the art will recognize that other channels or carriers may be utilized in addition to those illustrated, such as other traffic, control, and feedback channels.

In some examples, a physical layer may generally multiplex and map these physical channels described above to transport channels for handling at a medium access control (MAC) layer entity. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In some examples, the air interface in the RAN 200 may utilize one or more duplexing algorithms. 'Duplex' generally refers to scenarios where both endpoints in a point-to-point communication link can communicate with one another in both directions. 'Full-duplex' generally refers to scenarios where both endpoints can simultaneously communicate with one another on the same set of resources. 'Half-duplex' generally refers to scenarios where only one endpoint can send information to the other at a time utilizing a given resource. Full-duplex emulation is frequently implemented for wireless links by utilizing frequency division duplex (FDD) or time division duplex (TDD). In FDD systems, transmissions in different directions operate at different carrier frequencies. In TDD systems, transmissions in different directions on a given channel (e.g., a given carrier) are separated from one another using time division multiplexing. That is, the channel is sometimes dedicated for transmissions in one direction (e.g., DL), while at other times, the channel is dedicated for transmissions in the other direction (e.g., UL), where the direction may change very rapidly, e.g., several times per slot.

Full Duplex Carrier Examples

Figure 4:
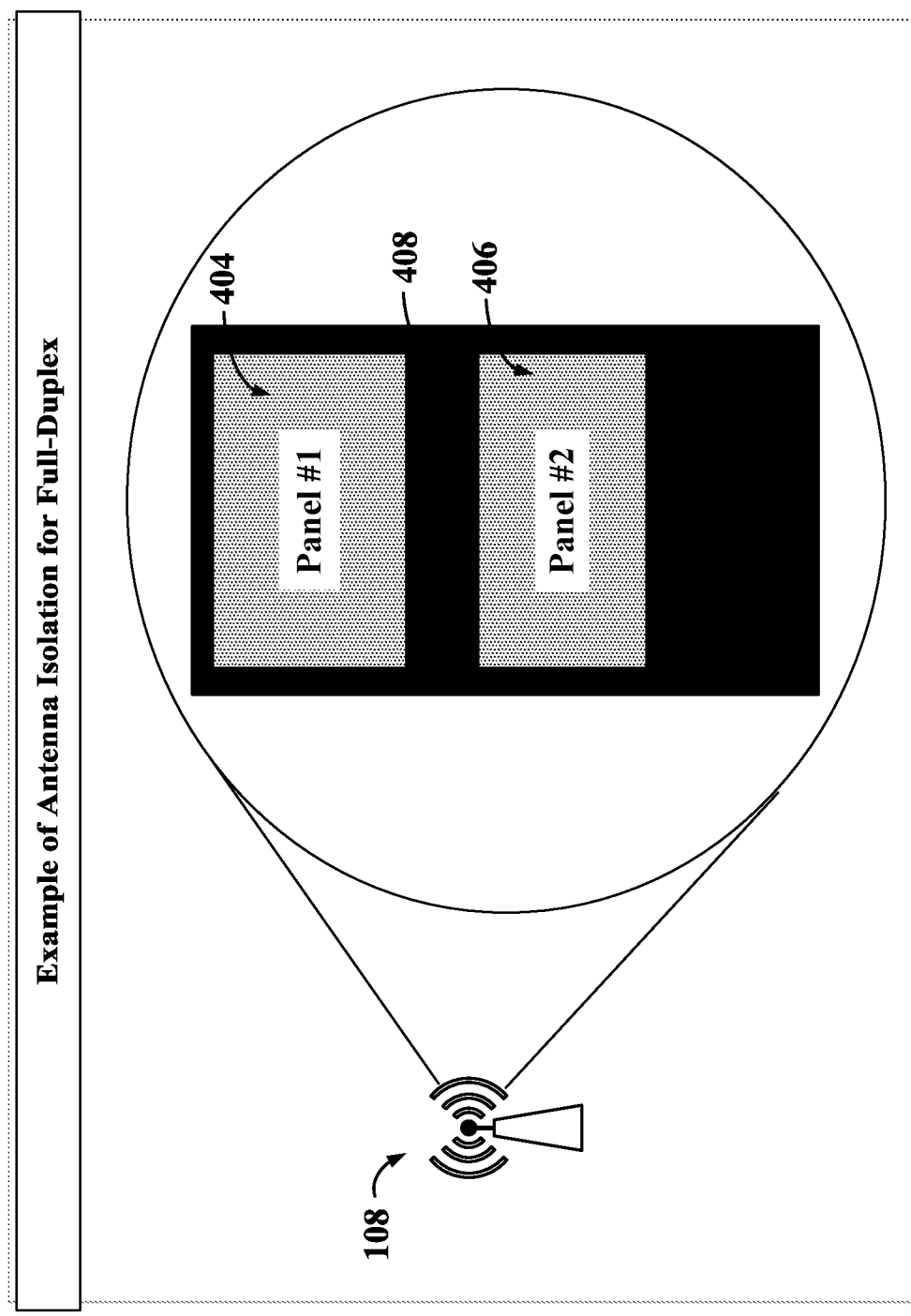
FIG. 4 is a detail view of an example of a scheduling entity with antenna panels according to some embodiments.

In a wireless link (e.g., wireless communication system 100), a full-duplex channel generally relies on physical isolation of a transmitter and receiver, and suitable interference cancellation technologies. In some examples, a scheduling entity 108 may provide for improved isolation between simultaneous transmission and reception operations. In an example, the scheduling entity 108 may utilize two separate, physically isolated antenna panels for UL communication and DL communication, respectively. In an example, as shown in FIG. 4, when communicating over a full-duplex carrier, a scheduling entity 108 may utilize an antenna panel 404 (e.g., Panel #1) for DL transmissions (Tx), and an antenna panel 406 (e.g., Panel #2) for UL reception (Rx).

Nevertheless, even with such physical isolation 408 of transmit and receive antenna panels, a wireless communication endpoint carrying out full-duplex communication still faces significant interference. And in particular, self-interference generated at that same endpoint can be substantial. In some examples, the transmit antennas and receive antennas at the scheduling entity 108 may be in close proximity to one another. A DL transmission, as such, may then interfere with a UL signal received, for example, using antenna panel 406. This interference can make it difficult for the scheduling entity 108 to decode a received UL signal.

Figure 5:
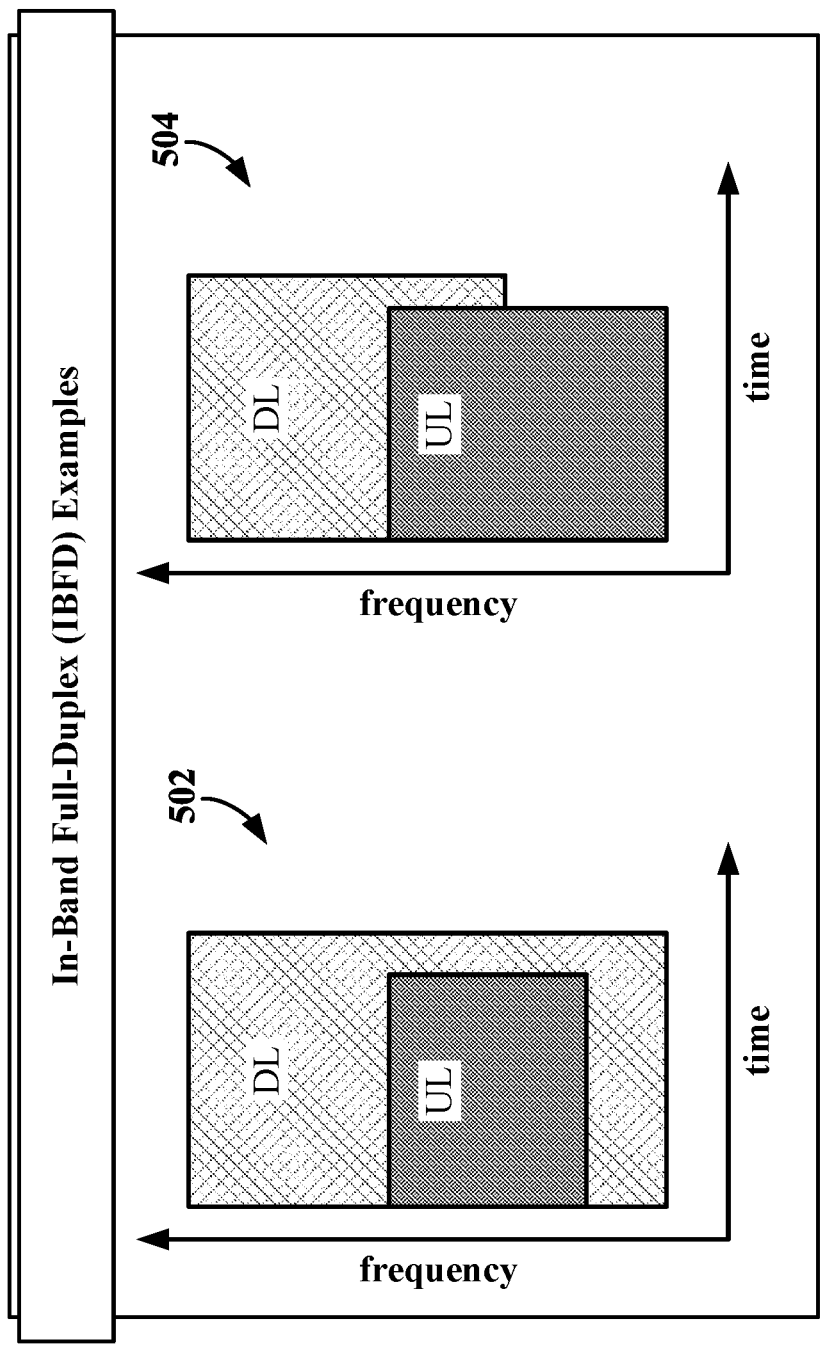
FIG. 5 is a schematic illustration of in-band full-duplex (IBFD) communication according to some embodiments.

One example of a full-duplex communication scheme is often referred to in the art as in-band full-duplex (IBFD). In IBFD, generally, DL and UL communications overlap in time and frequency. FIG. 5 illustrates a first example IBFD carrier 502, and a second example IBFD carrier 504. In some examples, the overlap can be complete/full, as shown in the first example, where the UL overlaps fully with the DL in frequency. In another example, the overlap can be partial, as shown in the second example, where the UL overlaps partially with the DL in frequency.

While the IBFD carriers 502 and/or 504 may be described, in some instances, as being whole carriers, the techniques of this disclosure are not so limited, and a person of ordinary skill in the art would understand that the IBFD carriers 502 and/or 504 may instead represent a particular bandwidth part (BWP) on a given wireless carrier. That is, in various instances, a wireless carrier may include BWPs that are mixed, such that a width of a particular BWP may include a mix of DL portions and UL portions in a single BWP of a given wireless carrier (e.g., IBFD carrier 502, IBFD carrier, 504, etc.). It will be understood that a given wireless carrier may have multiple such BWPs (e.g., mixed BWPs, etc.).

Recently, interest has turned toward what those skilled in the art may variously refer to as sub-band full-duplex (SBFD) or flexible duplex. SBFD differs from conventional FDD in that, in FDD, a given carrier is typically fully dedicated either for UL communication or DL communication. With SBFD, a portion of the time-frequency resources on a given carrier is dedicated for UL, and a portion of the time-frequency resources on that same carrier supports DL. Accordingly, an endpoint (e.g., scheduling entity 108, scheduled entity 106) communicating while utilizing SBFD transmits and receives at the same time, but on different frequency resources of the same carrier. That is, the DL resource is separated from the UL resource in the frequency domain.

Figure 6:
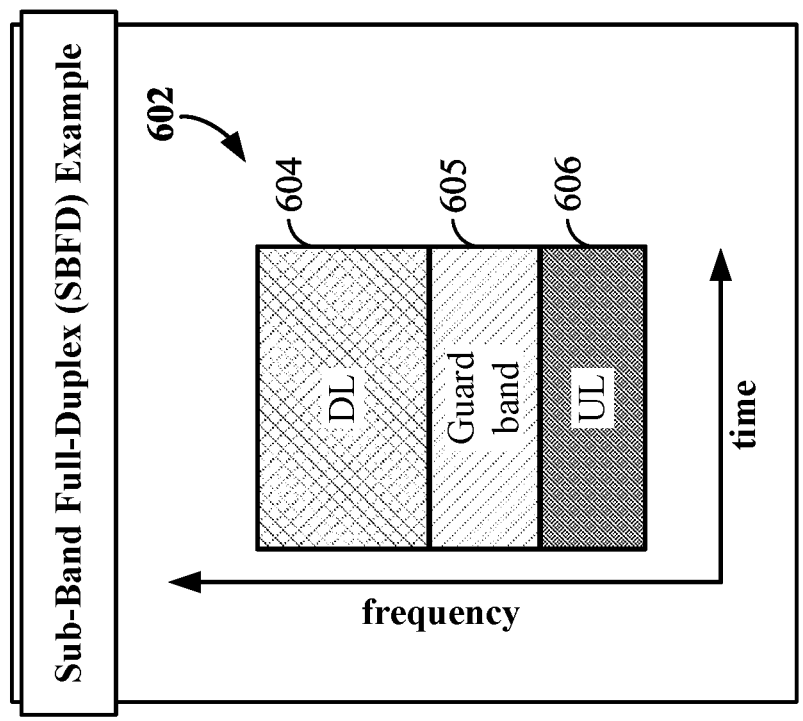
FIG. 6 is a schematic illustration of sub-band full-duplex (SBFD) communication according to some embodiments.

FIG. 6 illustrates one example of a slot for an SBFD carrier 602. In the illustrated example, the DL portion 604 of the slot and the UL portion 606 of the slot are separated from one another in frequency, with a guard band (GB) 605 between the respective UL and DL portions to reduce interference such as leakage of the UL into the DL, or leakage of the DL into the UL. However, because the GB 605 may be relatively narrow (e.g., four resource blocks (RBs), five RBs, six RBs, etc.) compared to the separation between carriers in conventional FDD, wireless communication utilizing SBFD may suffer from a greater amount of interference than conventional FDD. With respect to self-interference, a scheduling entity 108 utilizing SBFD may have its DL transmission disadvantageously leaking into its UL receiving portion; and a scheduled entity 106 utilizing SBFD may have its UL transmission disadvantageously leak into its DL receiving portion.

When communicating over an SBFD wireless carrier (e.g., SBFD carrier 602), a scheduling entity 108 may utilize antenna panel 404 for DL transmission at one portion on the SBFD carrier, while using antenna panel 406 for UL receiving at another portion on the SBFD carrier. Accordingly, self-interference at the scheduling entity 108 can be reduced to some degree via physical isolation 408 of the antennas. In various examples, the respective UL and DL portions of the SBFD carrier may be allocated within a given slot utilizing any suitable configuration, separated by frequency, time, or both frequency and time. Again, while the SBFD carrier 602 may be described, in some instances, as being a whole carrier, the techniques of this disclosure are not so limited, and a person of ordinary skill in the art would understand that the SBFD carrier 602 may instead represent a particular bandwidth part (BWP) on a given wireless carrier. That is, in various instances, a wireless carrier may include BWPs that are mixed, such that a width of a particular BWP may include a mix of DL portions (e.g., the DL portion 604) and UL portions (e.g., the UL portion 606) in the BWP of a given wireless carrier.

Figure 7:
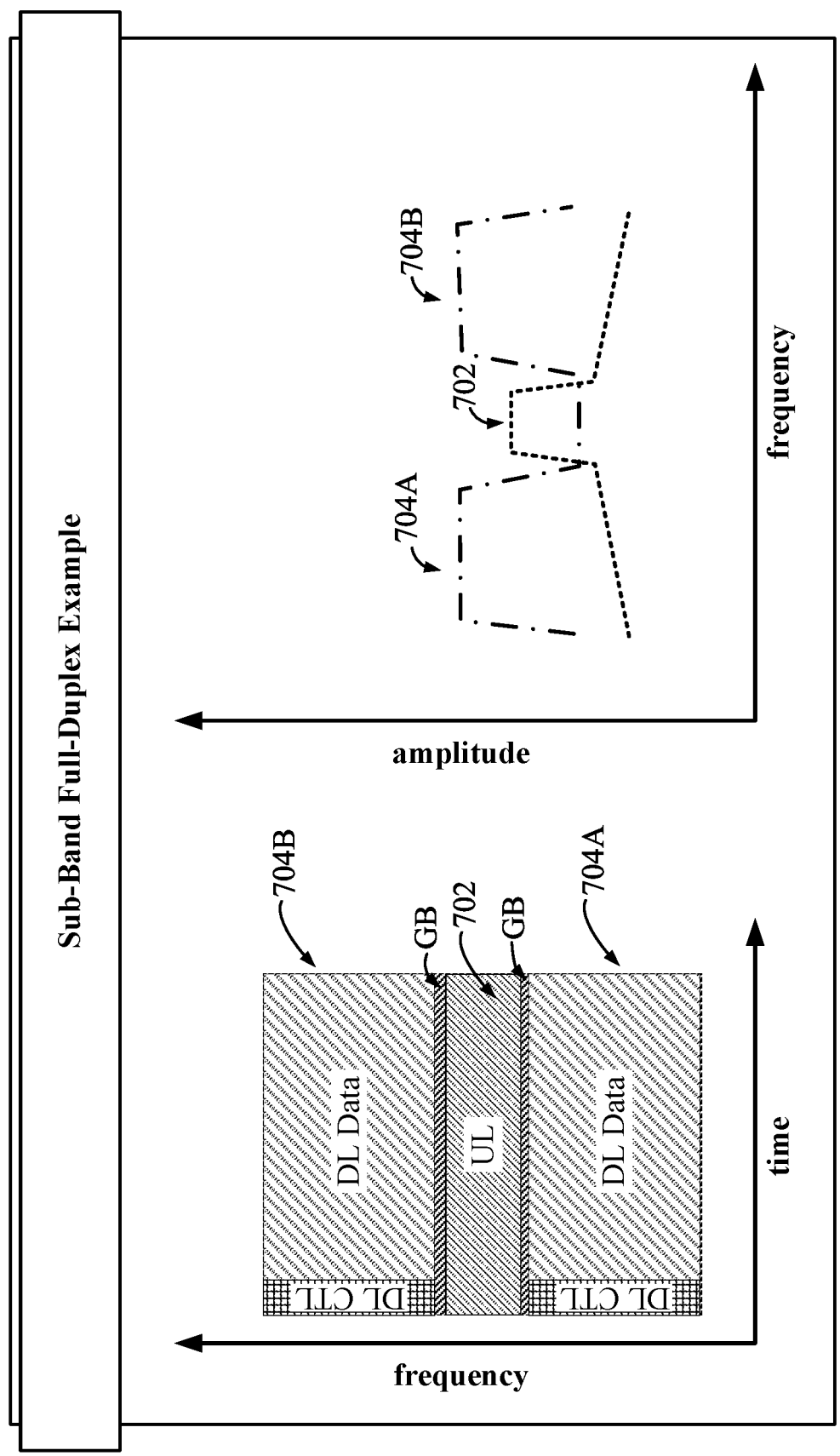
FIG. 7 is a conceptual illustration of an example slot configured for SBFD according to some embodiments.

FIG. 7 is a conceptual illustration of an example slot configured for wireless communication utilizing sub-band full-duplex (SBFD) according to an aspect of the present disclosure. In the illustrated slot, the upper portion 704B and the lower portion 704A of the slot (in frequency) are utilized for downlink (DL) communication, and in between those portions lies an uplink (UL) portion 702 utilized for UL communication (e.g., physical uplink shared channel (PUSCH)). As shown, one or more guard bands (GBs) may separate the UL portion 702 from the DL portions 704, located immediately above and below the UL portion 702 (in frequency).

The example slot illustrated in frequency and time on the left-hand side in FIG. 7 is illustrated in amplitude and frequency for further detail on the right-hand side of FIG. 7 as well. As shown, the amplitude for the DL communication is low at the frequency portion corresponding to the UL portion 702 of the example slot (e.g., in between DL portions 704A and 704B), and is high at the frequency portion corresponding to the DL portions 704A and 704B of the example slot. Likewise, the amplitude for the UL communication is high at the frequency portion corresponding to the UL portion 702 of the example slot (e.g., in between DL portions 704A and 704B), and is low at the frequency portion corresponding to the DL portions 704A and 704B of the example slot. A scheduled entity 106 and a scheduling entity 108 may utilize an example slot having this slot format or other such formats (e.g., having at least one DL portion and at least one UL portion) to communicate with one another over an SBFD carrier.

Figure 8:
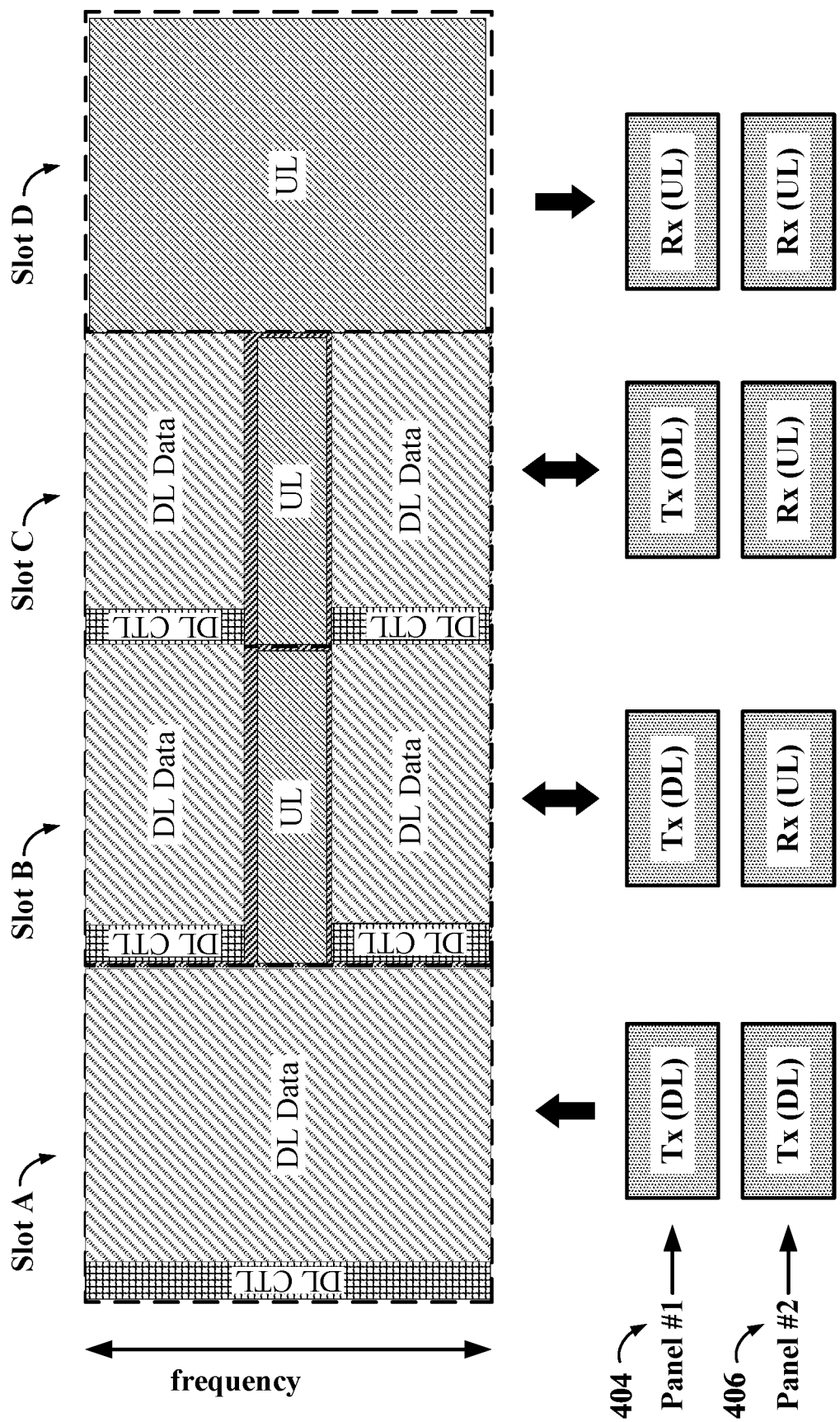
FIG. 8 is a schematic illustration of a series of slots on a wireless carrier, and corresponding operation of antenna panels, according to some embodiments.

FIG. 8 shows a sequence of four consecutive slots (e.g., Slots A-D) on a wireless carrier configured to allow dynamic reconfiguration between slots for time division duplex (TDD) and sub-band full-duplex (SBFD) communication. In some examples, the scheduling entity 108 may designate respective portions of the carrier within a given slot as an uplink (UL) portion or as a downlink (DL) portion. The scheduling entity 108 may signal the designation of the UL and DL portions to a scheduled entity 106 by utilizing a suitable indication or configuration message that enables a scheduled entity 106 to determine a slot format. For example, a scheduled entity 106 may determine a slot format for a given slot based on a suitable indication or configuration message provided by a scheduling entity 108. This indication or configuration message may be included within DL control information (DCI) (e.g., DCI 114), within higher-layer (e.g., radio resource control (RRC)) signaling, or some combination of these. The slot format corresponds to a configuration of resource elements (REs) within a slot as either for UL, DL, or, in some examples, as being flexible (can be either UL or DL). In various examples, a configuration or indication message utilized by a scheduled entity 106 to determine a slot format may correspond to any suitable number of one or more slots, and may correspond to contemporaneous and/or later-used slot(s).

As illustrated, the first slot (Slot A) is configured for TDD, wherein the full carrier bandwidth is utilized for DL communication, other than the final one or two OFDM symbols of the slot, where the full carrier bandwidth may be utilized for UL communication, such as a HARQ-ACK, channel state feedback (e.g., CSI), and/or UL user data. The second slot (Slot B) and third slot (Slot C) are configured utilizing SBFD in essentially the same way as described herein and illustrated in FIG. 7, with DL communication at the upper and lower portions of the slots (e.g., on the carrier) and UL communication in between the DL portions. As discussed herein, the UL portion of the carrier is shown being separated from the DL portions of the carrier by suitable-bandwidth guard bands (GBs) above and below the UL portion (in frequency). The fourth slot (Slot D) illustrated in FIG. 8 is configured for TDD, as fully for UL communication. In some examples, the slots shown may represent portions of carriers (e.g., bandwidth parts (BWPs) of a carrier) or whole carriers depending on the implementation.

In an example of a scheduling entity 108 including at least one first antenna panel 404 and at least one second antenna panel 406 described with reference to FIG. 4, the operation of the respective antenna panels during the different slots is illustrated below the respective slots in FIG. 8. That is, in the first slot (Slot A), both antenna panels 404 and 406 are utilized for DL communication. Likewise, in the fourth slot (Slot D), the scheduling entity 108 may utilize both antenna panels 404 and 406 for UL reception. In the second and third illustrated slots (Slots B and C), which are configured for SBFD, the first antenna panel 404 is configured for DL transmission, while the second antenna panel 406 is configured for UL reception.

Resource Mapping

Figure 9:
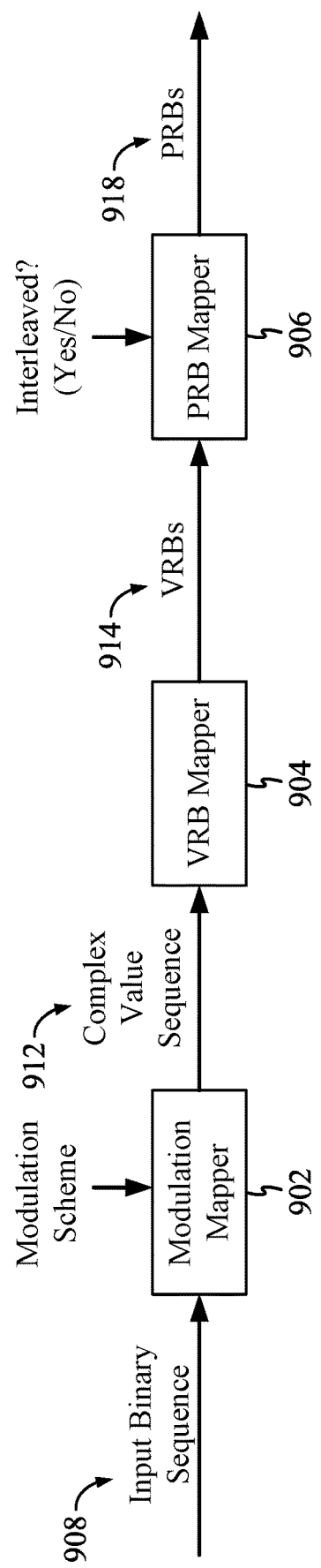
FIG. 9 is a block diagram illustrating hardware or circuitry capable of performing a resource allocation process according to some embodiments.

For transmissions of the PDSCH, a scheduling entity 108 may modulate a codeword utilizing any suitable modulation scheme, including but not limited to QPSK, 16QAM, 64QAM, 256QAM, etc. In an example described with reference to FIG. 9, a modulation mapper 902 at a scheduling entity 108 may transform a codeword (e.g., one that includes a sequence of binary digits (0 or 1)) into a sequence 912 of complex-valued symbols corresponding to a selected modulation scheme. After the modulation mapper 902, a virtual resource block (VRB) mapper 904 maps the complex value sequence 912 to resource elements (REs) in selected VRBs 914. A physical resource block (PRB) mapper 906 then maps the VRBs 914 to PRBs 918. Here, the PRBs 918 are the actual physical resources with which the scheduling entity 108 provides a DL transmission. A scheduling entity 108 may utilize VRBs 914 between the modulation mapper 902 and the PRB mapper 906 to provide for interleaving in a wireless transmission.

According to one example, the VRB mapper 904 may only map a complex value sequence 912 to those VRBs 914 assigned for transmission which meet a set of defined criteria, as described in 3GPP TS 38.211 clause 7.3.1.5. In such examples, the VRB mapper 904 may not map the complex value sequence 912 to VRBs 914 that do not meet the set of criteria. For example, the VRB mapper 904 may map complex value sequence 912 to those VRBs that the scheduling entity 108 assigns for transmission (e.g., those resources that will be scheduled for a scheduled entity 106 in DCI 114). In another example, the VRB mapper 904 may determine to map complex value sequence 912 using VRBs, where those VRBs' corresponding PRBs 918 are declared as available (e.g., not declared as unavailable) for PDSCH. In some examples, a bitmap may indicate whether a PRB is declared as unavailable or available, for example, using a binary indicator for the PRBs to designate them as available or in the alternative, as unavailable. In another example, the VRB mapper 904 may determine to map complex value sequence 912 using VRBs, where the corresponding REs in those VRBs' corresponding PRBs 918 are:

not used for transmission of the associated DM-RS or DM-RS intended for other co-scheduled UEs;

not used for non-zero-power CSI-RS if the corresponding PRBs are for PDSCH scheduled by PDCCH with CRC scrambled by C-RNTI, MCS-C-RNTI, CS-RNTI, or PDSCH with semi-persistent scheduling (SPS), except if the non-zero-power CSI-RS is a CSI-RS configured by the higher-layer parameter CSI-RS-Resource-Mobility in the MeasObjectNR information element (IE), or except if the non-zero-power CSI-RS is an aperiodic non-zero-power CSI-RS resource; and not used for PT-RS.

And still further, the corresponding REs in those VRBs' corresponding PRBs 918 must not be declared as 'unavailable' (i.e., 'not available') for PDSCH in accordance with 3GPP TS 38.214 clause 5.1.4. For example, the corresponding REs cannot be occupied by an SSB, or declared as unavailable utilizing higher-layer (e.g., radio resource control (RRC)) signaling. REs may also be unavailable for a PDSCH when the PDSCH is scheduled by a PDCCH with CRC scrambled by C-RNTI, MCS-C-RNTI, CS-RNTI, or PDSCHs with SPS. This list is not intended to be exhaustive or limiting, and within various aspects of the present disclosure, a scheduling entity 108 may utilize any suitable rules to declare such PRBs, and/or REs within such PRBs as unavailable for a PDSCH transmission. For a set of resources that are indicated as not available for PDSCH transmission, a scheduled entity 106 may be configured with RB-level and/or RE-level granularity.

The VRB mapper 904 may further utilize "type 0" or "type 1" frequency domain resource allocation (FDRA) to schedule resources in a given VRB for a PDSCH. With DL resource allocation of type 0, a scheduling entity 108 may provide a scheduled entity 106 with a bitmap having bits that represent an allocation in multiples of resource block groups (RBGs). In some examples, each bit in the bitmap can inform a scheduled entity 106 whether a corresponding RBG is allocated to that scheduled entity 106 for DL communication. An RBG may represent a set of consecutive VRBs. In an example, an RBG may be defined by a higher layer parameter to represent a set of VRBs.

With DL resource allocation of type 1, a scheduling entity 108 may provide a scheduled entity 106 with a consecutive, contiguous RB allocation. In an example, a scheduling entity 108 may send, to the scheduled entity 106, information representing a starting RB, and information representing a number of consecutive RBs (e.g., 'L' RBs, with 'L' being an integer). In an example, the information sent to the scheduled entity 106 may include a resource indication value (RIV) corresponding to a starting resource block ($RB_{start}$) or starting resource block group ($RBG_{start}$), and a length in terms of contiguously allocated resource blocks ($L_{RBs}$) or in terms of contiguously allocated resource block groups ($L_{RBGs}$). In this way, a scheduling entity 108 may transmit, and a scheduled entity 106 may in turn receive, a DL resource allocation in the form of a scheduling grant (e.g., a type 1 grant message). In an example, the scheduled entity 106 may receive a scheduling grant with a predefined DCI format indicator. From the DCI format indicator, the scheduled entity 106 may determine whether to use DL FDRA type 0 or type 1 (e.g., to communicate over the wireless carrier utilizing a slot having a particular slot format). In some examples, the DL resource allocation may include the RIV information for the scheduled entity 106 to process and utilize to determine whether an overlapping portion (e.g., full/partially) exists between the DL resource allocation and the resources designated as unavailable for DL transmission on an SBFD wireless carrier.

By utilizing DL resource allocation of type 0, any desired resource configuration can essentially be provided, with any combination of bits in the bitmap being possible in theory. However, the bitmap provided in DL resource allocation 'type 0' results in increased overhead compared to DL resource allocation 'type 1.' That is, FDRA type 1 achieves a resource allocation with significantly reduced overhead compared to FDRA type 0 for DL resource allocation.

In such examples, the PRB mapper 906 may map the VRBs 914 to PRBs 918 according to either an interleaved or non-interleaved mapping scheme. With a non-interleaved mapping scheme, the PRB mapper 906 may essentially directly map a VRB to a corresponding PRB. An interleaved mapping scheme, on the other hand, provides for essentially a shuffling among the different frequency subcarriers.

As discussed above, with SBFD (e.g., flexible duplex), a portion of a carrier bandwidth may be utilized for UL communication, and another portion of the same carrier bandwidth may be utilized for DL communication. However, with a type 1 DL resource allocation performed by a VRB mapper 904, a conflict may result with SBFD. That is, a continuous resource allocation for the PDSCH (as performed for a type 1 DL resource allocation) may overlap with resources already set aside for the PUSCH in that same carrier. Although in some particular cases, there may be some advantages to utilizing an overlapping portion between DL and UL communications, according to an aspect of the present disclosure, it may be advantageous, with SBFD in general, for a scheduled entity 106 to avoid utilizing resources related to such overlapping portions for DL resource allocation when the scheduled entity 106 has identified those resources as 'not available' for DL. In an example, the scheduled entity 106 may disregard resource elements (REs) related to such overlapping portions. That is, the scheduled entity 106 may assume REs related to such overlapping portions are unavailable for PDSCH and thus, the scheduled entity 106 may disregard such REs and instead, may process REs in non-overlapping portions, when communicating over the SBFD carrier.

In some examples, as discussed above, a VRB mapper 904 may provide for a contiguous set of resource blocks (RBs) in the frequency domain. In an example, the VRB mapper 904 may utilize a type 1 DL resource allocation (e.g., FDRA type 1) to provide for a contiguous set of RBs being allocated for a PDSCH. In this case, a PRB mapper 906 that is utilizing a non-interleaved VRB-to-PRB mapping also may provide for a contiguous frequency domain allocation for the PDSCH in the physical resource allocation. Furthermore, even if the PRB mapper 906 is utilizing an interleaved VRB-to-PRB mapping, depending on the interleaving scheme, an interleaving operation may still lead to a contiguous frequency domain allocation for the PDSCH in the physical resource allocation. Such a contiguous allocation for a DL channel (e.g., the PDSCH) can cause an issue if a carrier is configured for SBFD (e.g., as a wireless carrier having a UL portion in between DL portions of the carrier, as illustrated in FIG. 7). That is, as illustrated in FIG. 7, there may be a relatively large band of RBs not available for DL transmission, as the band has been set aside for UL communication (e.g., for the PUSCH).

In some examples, if the starting RB of the type 1 DL resource allocation is below the PUSCH (in frequency), and the number of consecutive RBs of the type 1 DL resource allocation is enough to extend across this PUSCH, then a conflict may exist at an overlapping portion of a given slot (e.g., a partial overlap or a full overlap). Indeed, this conflict may, at times, be intentional or useful, such as where a scheduling entity 108 may be transmitting information including but not limited to an SSB, over resources set aside for UL communication. In other instances, however, a scheduled entity 106 may receive and process information in the UL portion of the carrier that, as such, does not actually carry any useful information for the scheduled entity 106.

In some specifications for 5G NR, this conflict may be addressed by including the resources of the UL portion of the carrier as resources not allowed for DL transmission. However, these specifications only provide for such inclusion of resources as not being allowed by providing a bitmap corresponding to those resources, which can cause a large amount of control signaling overhead. This can be an unacceptable cost, as the type 1 DL resource allocation is generally intended for reducing such signaling overhead relative to a type 0 DL resource allocation. That is, this conflict would generally not arise when utilizing a type 0 DL resource allocation, as the scheduling entity 108 explicitly spells out available and unavailable resources to the scheduled entity 106 in the form of a large bitmap. But when the conflict arises when utilizing a type 1 DL resource allocation, a potential, non-ideal solution calls for the scheduling entity 108 to explicitly spell out to the scheduled entity 106 the set of unavailable resources in the form of a similarly large bitmap. Various aspects of the present disclosure aim to address the above-described issue in a type 1 DL resource allocation without costing such a significant increase in signaling overhead.

Informing a Scheduled Entity of Unavailable Resources

Some aspects of the present disclosure provide mechanisms and algorithms to address a situation wherein, for a type 1 downlink (DL) frequency domain resource allocation (FDRA) on an SBFD carrier, at least a portion of the allocated physical resource blocks (PRBs) for DL communication overlaps with resources that a slot format sets aside for UL communication. In an example, a slot format may set aside resources for different communications using a slot format indication that indicates which resources are set aside as such.

Furthermore, the overlapping portion where the DL resource allocation (e.g., the allocated PRBs) overlaps with the UL portion set aside for UL communication may include a partial overlap or a full overlap in frequency where, in the overlapping portion, at least a portion of the DL resource allocation overlaps with at least a portion of the UL portion.

It should be noted that while this disclosure may describe a slot format, in certain instances, as indicating certain frequency portions of a slot in a particular form, the techniques of this disclosure are not so limited. A person of ordinary skill in the art would understand that the slot format may represent various forms of information. In an example, the slot format may indicate at least one first frequency portion of a slot in terms of at least one first bandwidth part (BWP) corresponding to a wireless carrier. Likewise, the slot format may indicate at least one second frequency portion of the slot in terms of at least one second BWP corresponding to the wireless carrier. In an illustrative example, a base station (BS) may provide a UE with information indicative of at least one first frequency portion of a slot being for UL communication (e.g., unavailable for DL communication) and at least one second frequency portion of the slot being for DL communication. In such examples, the BS may provide the UE with information indicative of at least one first BWP and information indicative of a second BWP, where the at least one first frequency portion slot may correspond to the at least one first BWP and the at least one second frequency portion of the slot may correspond to the at least one second BWP. In this way, the UE may receive information from the BS indicative of the at least one first frequency portion of a slot being for UL communication. As such, the UE may determine the at least one first BWP corresponding to the at least one first frequency portion of the slot and likewise, may determine the at least one second BWP corresponding to the at least one second frequency portion of the slot.

In such examples, as described herein, the UE may receive a DL resource allocation from the BS. And upon determining to disregard information related to any resources that fall within an overlapping portion of the DL resource allocation, the UE may communicate with the BS further, such as over the wireless carrier according to the bandwidth parts while disregarding the information related to the overlapping portion, for example, corresponding to the first BWP. In this way, the UE may utilize the slot format to communicate with the BS over the wireless carrier while disregarding DL data corresponding to an overlapping portion of the slot (e.g., an overlapping portion of the first BWP) having resources unavailable for DL communication.

While the description that follows refers to FIGS. 12-17, which generally illustrate processes that take place at a scheduled entity 106 (e.g., a user equipment (UE)), it is to be understood that this disclosure is not limited to operations or processes at a scheduled entity 106. That is, the description that follows also describes processes and operations that take place at a scheduling entity 108 (e.g., a base station (BS), another UE configured for scheduling, etc.), and the present disclosure is written to fully disclose operations at both endpoints of a signaling exchange between said scheduled entity 106 and scheduling entity 108.

Figure 12:
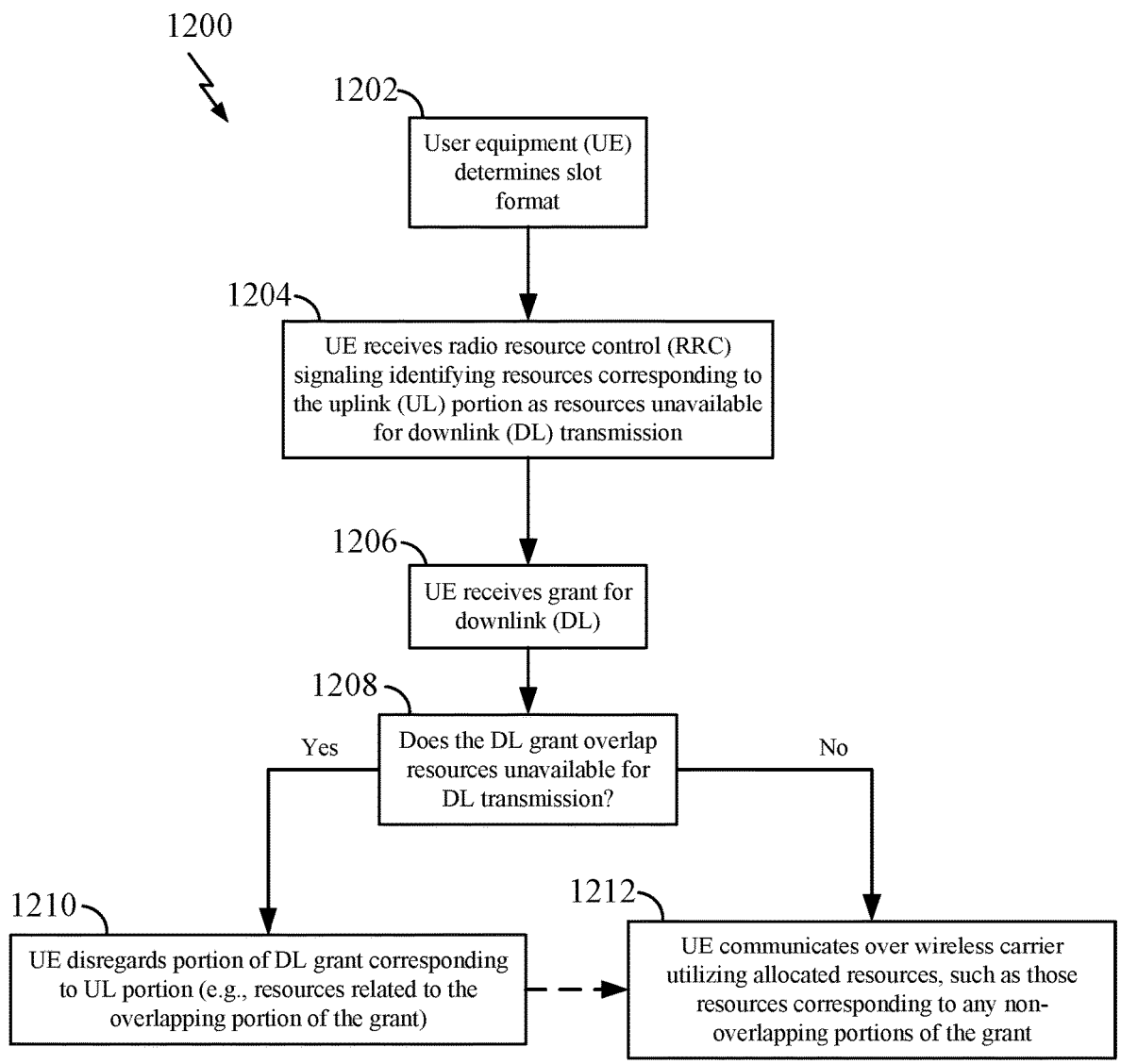
FIG. 12 is a flow chart illustrating an exemplary process for a scheduled entity to receive information identifying a specific set of resources as unavailable for downlink (DL) transmission according to some embodiments.

FIG. 12 is a flow chart illustrating an exemplary process 1200 for a scheduled entity 106 (e.g., a UE) to receive information (e.g., from a scheduling entity 108). The information can be configured to indicate or identify resources for communication. This can include identifying a specific set of resources as unavailable for DL transmission in accordance with some embodiments.

In an example, the scheduling entity 108 may identify a set of resources as unavailable for DL transmission. In such examples, the scheduling entity 108 may communicate the set of resources (e.g., as a representation of the set of resources) to the scheduled entity 106. In such examples, the scheduled entity 106 may utilize the set of resource to determine which resources are available for DL transmission (e.g., resources corresponding to a DL portion of an SBFD carrier). In addition, or alternatively, the scheduled entity 106 may utilize the set of resource or the representation of the set of resources to determine which resources are unavailable for DL transmission. In an example such unavailable resources may include resources of the SBFD carrier set aside for UL communication, resources corresponding to a guard band (GB) portion of the SBFD carrier, resources corresponding to a dynamically indicated portion of the SBFD carrier, and so forth. In this way, the scheduled entity 106 may determine when to allocate suitable processing resources to more fully consider (and/or allow to pass further along through the wireless network) certain DL data corresponding to those resources deemed available for DL transmission. In addition, or alternatively, the scheduled entity 106 may determine when to advantageously disregard DL data corresponding to those resources deemed unavailable for DL transmission to avoid, for example, adversely affecting any UL data communicated in one or more UL transmissions over the SBFD carrier.

As described herein, a particular implementation may omit some or all illustrated features, and may not require some illustrated features to implement all embodiments. In some examples, the scheduling entity 1000 illustrated in FIG. 10 and/or the scheduled entity 1100 illustrated in FIG. 11 may be configured to carry out the process 1200. In some examples, any suitable apparatus or means for carrying out the functions or algorithm described herein may carry out the process 1200.

At block 1202, a scheduled entity 106 may determine a slot format for one or more slots. In an example, the scheduled entity 106 may receive an indication or configuration message from the scheduling entity 108 (e.g., a BS) sufficient for the scheduled entity 106 to determine a slot format for a given slot. The indication or configuration message may identify a UL portion of a slot (e.g., a first frequency portion) and at least one DL portion of the slot (e.g., a second frequency portion). That is, a slot format indication or configuration message may identify at least one portion of a slot as being for UL communication and at least one other portion as being for DL communication. In some scenarios, additionally or alternatively, the scheduled entity 106 may determine a slot format for at least one slot on an SBFD carrier. A slot configured according to the slot format may include at least one first frequency portion and at least one other frequency portion. As such, the at least one first frequency portion of such a formatted slot may be for UL communication and the at least one other frequency portion may be for DL communication.

Slot format related messaging can take on various forms. In an example, the slot format indication or configuration message may include a format index identifying the slot format configuration. The scheduled entity 106 may utilize the format index to determine a frequency portion of a slot that has been set aside for UL communication. In some examples, a higher layer parameter may configure the scheduled entity 106 with the slot format as having at least one frequency portion designated for DL communication and at least one frequency portion designated for UL communication.

At block 1204, the scheduled entity 106 may receive a control message (e.g., a radio resource control (RRC) message) from another entity (e.g. a scheduling entity or other wireless device). The control message can indicate or identify a set of resources corresponding to a UL portion of the slot as including resources not available for DL transmission. In an example, a scheduling entity 108 may provide a scheduled entity 106 with suitable signaling (e.g., by utilizing higher-layer signaling such as RRC signaling) to inform the scheduled entity 106 that the UL portion of the slot is included in the set of resources unavailable for DL transmission. In some examples, this mechanism may be similar to a scheduling entity 108 signaling the scheduled entity 106 that there is a rate matching around the UL portion (e.g., around a UL band).

Control messaging can have a variety of features. In some examples, a scheduling entity 108 may provide a scheduled entity 106 with information indicating a start indication (e.g., a start RB; or a start RE) and a length indication (e.g., a number of RBs; or a number of REs) of certain resources that are not available for DL transmission. In such examples, the control message (e.g., the radio resource control (RRC) message) may include the starting resource (e.g., a start indication), and a length corresponding to the resources unavailable for DL transmission (e.g., a number of REs, a number of RBs). In some examples, the control message may include information indicating a group of starting resources. In such examples, the control message may specify the start indication in terms of a starting resource block group ($RBG_{start}$). Likewise, the control message may include information indicating the length as specified in terms of RBGs (e.g., $L_{RBGs}$ or a predefined number of RBGs), where resources within this set of RBGs may then be designated as corresponding to resources unavailable for DL transmission. That is, the control message may utilize various levels of granularity, such as by utilizing RE-level granularity, RB-level granularity, or as discussed further herein, RBG-level granularity, to effectively designate (e.g., assign) certain resources as unavailable for DL transmission.

The control message, in some instances, may include information indicating a set of resources for use in communication. This can indicate whether a resource set includes less than an entire set of resources corresponding to an entire UL portion when providing a start indication and a length indication. In another example, the set of resources may include more than the entire set of resources corresponding to the entire UL portion. In an example, the control message may indicate that the UL portion is unavailable for DL transmission and that additional resources (indicated with a starting resource and length resource) are also unavailable for DL transmission. In such examples, the scheduled entity 106 may receive a starting resource and length resource for the UL portion (e.g., explicit indication) or may determine such resources corresponding to the UL portion from the information indicating the slot format (e.g., the format index). In any case, the control message may configure the scheduled entity 106 to determine the set of resources unavailable for DL transmission.

Accordingly, a scheduled entity 106 may utilize the control message to designate any of the slot's resources (e.g., any RB/RE/RBG). Some of these resources may fall after a starting resource (e.g., the start indication) and within the length corresponding to the resources unavailable for DL transmission (e.g., the length indication) as effectively unavailable for DL transmission. That is, the scheduled entity 106 may determine that resources following the start indication within the length indication correspond to resources unavailable for DL transmission. Thus, the scheduled entity 106 may utilize information from the control message to then identify a set of resources designated accordingly as being unavailable for DL transmission. In some instances, the set of resources may correspond to at least some of the UL portion of a slot (e.g., the at least one UL band or first frequency portion of the slot). In addition, the set of resources may further correspond to one or more guard band (GB) portions of the slot that overlap with the first frequency portion of the slot for UL communication. That is, a UL frequency portion of a slot may, in some instances, effectively include one or more GB portions indicated as unavailable for DL transmission (e.g., via the start and length indication, and/or via a dynamic indication).

At block 1206, the scheduled entity 106 may receive a type 1 DL grant message for the slot. In an example, the scheduled entity 106 may receive, from the scheduling entity 108, a DL resource allocation for the slot. The scheduled entity 106 may receive the grant message as having a number of RBs or REs (e.g., related to different frequency portions of the slot) that the scheduled entity 106 may consider (e.g., by determining to process) or otherwise, disregard (e.g., ignore, forgo to process, omit, discard, exclude, etc.) according to one or more of the various techniques of this disclosure.

At block 1208, the scheduled entity 106 may determine if an overlap scenario may occur or is occurring. Overlap scenarios can exist when a DL grant message overlaps in frequency (e.g., partially or fully) with the resources designated as not available for DL transmission. In an example, the scheduled entity 106 may determine whether any portion of the DL resource allocation for the slot (e.g., the DL grant message) overlaps with resources designated as unavailable for DL communication (e.g., over the SBFD wireless carrier).

Alternatively, the scheduled entity 106 may make this determination when communicating over a wireless carrier by disregarding any portion of the DL grant message that overlaps with the resources designated as unavailable for DL transmission. That is, the disclosure, in some instances, presumes that a particular example for a DL grant message includes an overlapping portion (YES at block 1208) for illustration purposes, such that the disclosure may describe how a scheduled entity 106 may then disregard information related to the overlapping portion. In some instances, however, the DL grant message may not include any overlapping portion, in which case the scheduled entity 106 may utilize all resources of the DL grant message to communicate over the wireless carrier, rather than disregarding some of those resources as the scheduled entity 106 may do in instances of an overlapping portion being present. In any case, the scheduled entity 106 may identify an overlapping portion of a DL resource allocation (e.g., the DL grant message) by effectively ignoring information related to certain resources in frequency (e.g., related to a bandwidth part (BWP) for a frequency portion established as being specifically allocated for communication in the other direction (e.g., UL, opposite sidelink (SL) directions, etc.). In this way, the scheduled entity 106 may communicate with a scheduling entity 108 over a wireless carrier while ignoring information related to one or more overlapping portions. The scheduled entity 106 may do so by providing UL transmissions and receiving DL transmissions in slots on the wireless carrier, where, for example, both entities advantageously attend to the particular slot format of the slots in the particular manner as disclosed.

In some examples, the scheduled entity 106 may determine whether the DL grant message comprises resources that overlap with resources unavailable for DL transmission by any suitable means. In some examples, the scheduled entity 106 may determine whether the DL grant message comprises resources that overlap with resources unavailable for DL transmission by comparing at least a portion of the set of resources designated (e.g., via the control message) as unavailable with resources corresponding to the DL resource allocation for the slot (e.g., the DL grant message). In this way, the scheduled entity 106 may determine whether an overlap exists between at least some resources in the two sets of resources when compared against one another. In an example, the scheduled entity 106 may determine that both sets implicate one or more of the same resources (e.g., a subset of REs in an overlapping portion of the DL resource allocation). The scheduled entity 106 may then determine that an overlapping portion of the DL resource allocation indeed exists and that as such, the overlapping portion includes (e.g., implicates) resources previously designated as unavailable for DL transmission.

If the DL grant message overlaps with the resources designated as unavailable for DL transmission, then at block 1210, the scheduled entity 106 may take additional action. One example action is that the scheduled entity 106 may disregard REs located within the overlapping portion of the DL grant message. Opting not to use or disregarding (e.g., ignoring, forgoing to process, omitting, discarding, excluding, etc.) resources in an overlapping portion of the DL grant message may include passive non-use and/or more actively blocking of the resources related to the overlapping portion of the DL grant message. In an illustrative example, the scheduled entity 106 may receive, from a scheduling entity 108, information for the DL grant message as including a full set of resources (e.g., a set of REs). The scheduled entity 106 may receive information for the DL grant message corresponding to a first subset of resources of the full set of resources for the DL grant message. In this instance, the first subset of resources includes resources of the slot located in the portion of the DL grant message that overlaps with the UL portion of the slot (e.g., the portion that consists of resources deemed unavailable for DL transmission). In addition, the scheduled entity 106 may receive information corresponding to a second subset of resources of the full set of resources for the DL grant message. In this instance, the second subset of resources includes other resources of the slot located in a second, non-overlapping portion of the DL grant message (e.g., in a portion of the slot consisting of resources considered acceptable for DL communication).

In this illustrative example, the scheduled entity 106 may determine to process information corresponding to the second subset of resources (e.g., in the non-overlapping portion) and may disregard resources from the first subset of resources (e.g., in the overlapping portion). That is, the scheduled entity 106 may disregard resources from the first subset of resources without attempting to identify and/or retain any further the information or data that the first subset of resources represents. The scheduled entity 106 may disregard such resources actively, for example, by performing some processing to isolate such resource elements (REs) in the overlapping portions and remove the information related to the overlapping portion from any further processing. In another example, the scheduled entity 106 may disregard information related to such overlapping portions in frequency based on a purely passive mechanism whereby the scheduled entity 106 allocates processing resources for processing information related to non-overlapping portions, while intentionally passing over any resource elements determined to be related to an overlapping portion.

In such examples, the scheduled entity 106 may prioritize allocating processing resources for processing information related to one or more non-overlapping portions. As such, the scheduled entity 106 may then determine to allocate any processing resources set aside for processing information related to an overlapping portion of a wireless carrier to then be utilized for processing the information related to the non-overlapping portion(s) or to conserve such processing resources instead. In this way, the scheduled entity 106 communicate over the wireless carrier utilizing the slot format while disregarding (e.g., ignoring, shifting/re-allocating processing resources, etc.) any information related to an overlapping portion, such as where a DL resource allocation overlaps at least partially with a UL frequency portion.

In such instances, the scheduled entity 106 may disregard (e.g., ignore) information of the DL grant message corresponding to the UL portion of the slot. In an example, the scheduled entity 106 may communicate over an SBFD wireless carrier utilizing the slot while disregarding (e.g., ignoring) REs received in the overlapping portion of the DL grant message (e.g., information related to the overlapping portion). That is, the scheduled entity 106 may communicate over the wireless carrier utilizing the slot format (e.g., using the slot on the carrier configured according to the slot format) while disregarding information related to (e.g., that falls within) the overlapping portion.

If there is no such overlap (i.e., no overlapping portion), then at block 1212, the scheduled entity 106 may utilize the resources allocated in the DL grant message, and may receive and process the corresponding REs. In such examples, the scheduled entity 106 may communicate over the wireless carrier utilizing the slot format while, in such instances, utilizing all resources of the type 1 DL resource allocation for the slot. That is, the scheduled entity 106 may utilize all information corresponding to the REs allocated in the DL grant message without disregarding REs located in any portion of the DL grant message due to an overlapping portion creating a conflict between the slot format and the DL resource allocation.

Figure 13:
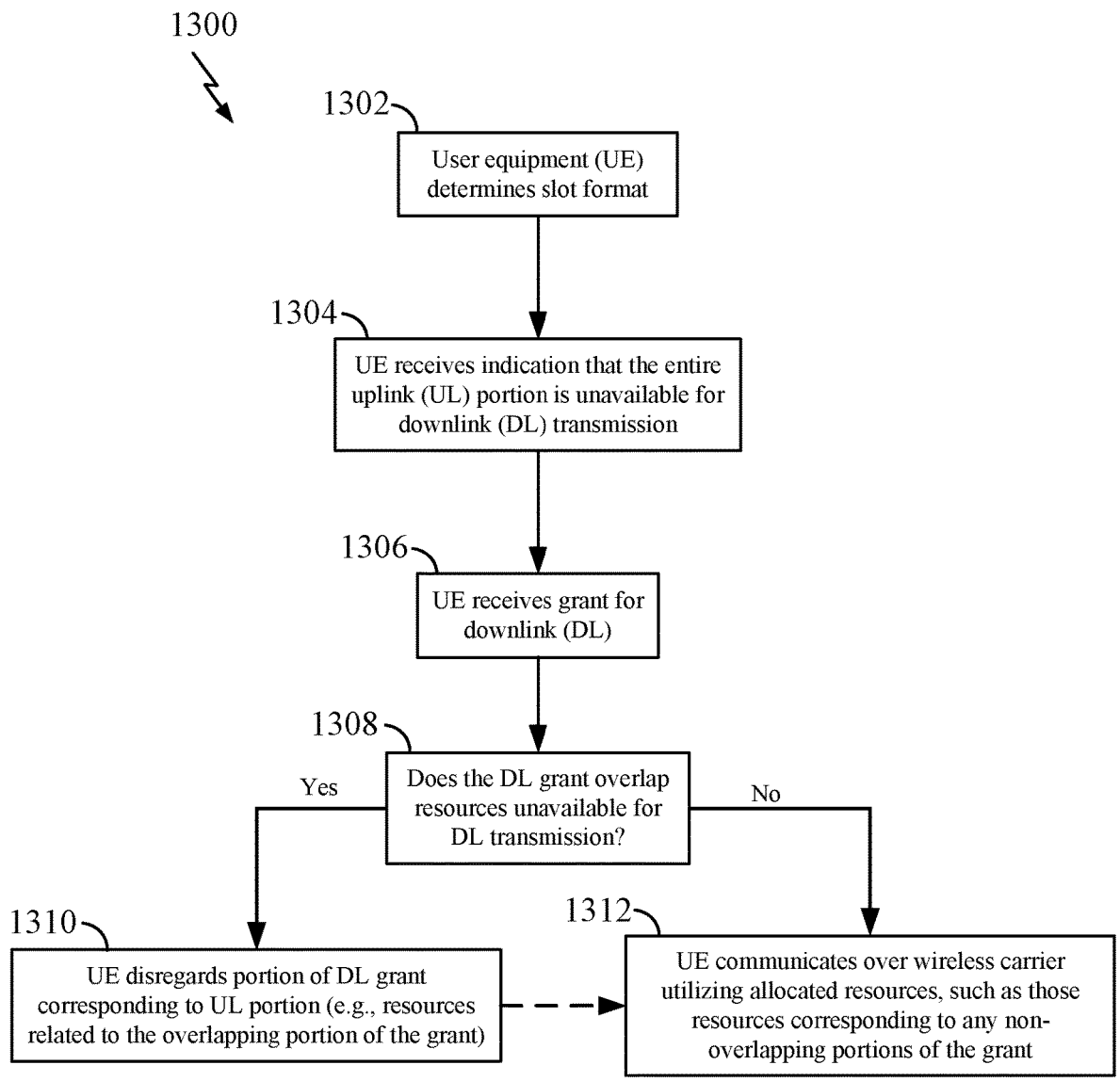
FIG. 13 is a flow chart illustrating an exemplary process for a scheduled entity to receive an indication that a portion of a slot designated for uplink (UL) communication in a slot format is unavailable for DL transmission according to some embodiments.

FIG. 13 is a flow chart illustrating an exemplary process 1300 for a scheduled entity 106 (e.g., a UE) to receive an indication that a portion of a slot designated for UL communication in a slot format is unavailable for DL transmission in accordance with some embodiments. As described herein, a particular implementation may omit some or all illustrated features, and may not require some illustrated features to implement all embodiments. In some examples, the scheduling entity 1000 illustrated in FIG. 10 and/or the scheduled entity 1100 illustrated in FIG. 11 may be configured to carry out the process 1300. In some examples, any suitable apparatus or means for carrying out the functions or algorithm described herein may carry out the process 1300.

At block 1302, a scheduled entity 106 may determine a slot format for one or more slots. In an example, the scheduled entity 106 may receive an indication or configuration message from a scheduling entity 108 (e.g., a BS) sufficient for the scheduled entity 106 to determine a slot format for a given slot. The indication or configuration message may identify a UL portion of a slot (e.g., a first frequency portion) and at least one DL portion of the slot (e.g., a second frequency portion).

At block 1304, the scheduled entity 106 may receive an indication that the entire UL portion of the slot (designated in the slot format configuration) is unavailable for DL transmission. In an example, a scheduling entity 108 may explicitly configure a scheduled entity 106 to designate the entire UL portion of the slot as resources unavailable for DL transmission. In such instances, the scheduled entity 106 may determine that the entire UL portion of the slot includes resources unavailable for DL transmission.

In addition, or alternatively, a scheduling entity 108 may explicitly configure the scheduled entity 106 to designate one or more guard band (GB) portions on either side or both sides of the UL portion of the slot (e.g., adjacent the UL portion and at least one DL portion of the slot) as resources (also) not available for DL transmission. In such instances, the scheduled entity 106 may determine that the entire UL portion of the slot and the one or more GB portions on either side or both sides of the UL portion of the slot include an entire set of resources unavailable for DL transmission.

In some examples, a scheduling entity 108 may provide explicit signaling to instruct the scheduled entity 106 that the UL portion of the slot, and in some examples, plus a GB or GBs (as indicated utilizing a slot format configuration), are unavailable (i.e., not available) for DL transmission. In still another example, the slot format configuration or indication message itself may include such an indication that the UL portion of the slot, and in some examples plus a GB or GBs, are unavailable for DL transmission. In an example, the scheduled entity 106 may receive the slot format configuration from a scheduling entity 108 and determine, from the slot format configuration, a slot format for the slot. Accordingly, the scheduled entity 106, when determining the slot format, may also determine, from the slot format configuration, that the entire UL portion of the slot (plus one or more GB portions, in some instances) represents resources unavailable for DL transmission. In some examples, this mechanism may be similar to a scheduling entity 108 signaling the scheduled entity 106 that there is a rate matching around the UL portion (e.g., around a UL band).

At block 1306, the scheduled entity 106 may receive a type 1 DL grant message for the slot. In an example, the scheduled entity 106 may receive, from the scheduling entity 108, a DL resource allocation for the slot. The scheduled entity 106 may receive the grant message as having a number of RBs or REs (e.g., related to different frequency portions of the slot) that the scheduled entity 106 may consider (e.g., by determining to process) or otherwise, disregard (e.g., ignore, forgo to process, omit, discard, exclude, etc.) according to one or more of the various techniques of this disclosure.

At block 1308, the scheduled entity 106 may determine whether the DL grant message overlaps in frequency (e.g., partially or fully) with the resources designated as not available for DL transmission. In an example, the scheduled entity 106 may determine whether any portion of the DL resource allocation for the slot (e.g., the DL grant message) overlaps with resources designated as unavailable for DL communication (e.g., over the SBFD wireless carrier). Alternatively, as described above, the scheduled entity 106 may make this determination when communicating over a wireless carrier by disregarding any portion of the DL grant message that overlaps with the resources designated as unavailable for DL transmission. In an example, block 1308 may represent an optional item (e.g., a descriptive item, or presumably factual item of the particular communication used for the example illustration). In an example, the item may be shown for illustration purposes to show that an overlapping portion may be present in certain instances. This block 1308 may further be shown as included in the example flow chart to indicate how one or more of the various techniques of this disclosure may apply to address certain DL information related to the overlapping portion. As described herein, the techniques of this disclosure address certain DL information related to the overlapping portion in a manner that seeks to avoid portions of the DL transmission from interfering with portions of a UL transmission, when a scheduled entity 106 is utilizing a particular wireless carrier to communicate with a scheduling entity 108.

If the DL grant message overlaps with the resources designated as unavailable for DL transmission, then at block 1310, the scheduled entity 106 may disregard REs located within the overlapping portion of the DL grant message. In this way, the scheduled entity 106 may disregard information of the DL grant message corresponding to the UL portion of the slot. In an example, the scheduled entity 106 may communicate over an SBFD wireless carrier utilizing the slot while disregarding (e.g., ignoring, forgoing to process, omitting, discarding, excluding, etc.) REs received in the overlapping portion of the DL grant message (e.g., information related to the overlapping portion). That is, the scheduled entity 106 may communicate over the wireless carrier utilizing the slot format (e.g., using the slot on the carrier configured according to the slot format) while disregarding information related to (e.g., that falls within) the overlapping portion.

If there is no such overlap (i.e., no overlapping portion), then at block 1312, the scheduled entity 106 may utilize the resources allocated in the DL grant message, and may receive and process the corresponding REs. In such examples, the scheduled entity 106 may communicate over the wireless carrier utilizing the slot format (e.g., transmitting a slot on the carrier, the slot formatted according to the slot format), where in such instances, the scheduled entity 106 may utilize all resources of the type 1 DL resource allocation for the slot. That is, the scheduled entity 106 may utilize all information corresponding to the REs allocated in the DL grant message without disregarding REs located in any portion of the DL grant message due to an overlapping portion creating a conflict between the slot format and the DL resource allocation.

Figure 14:
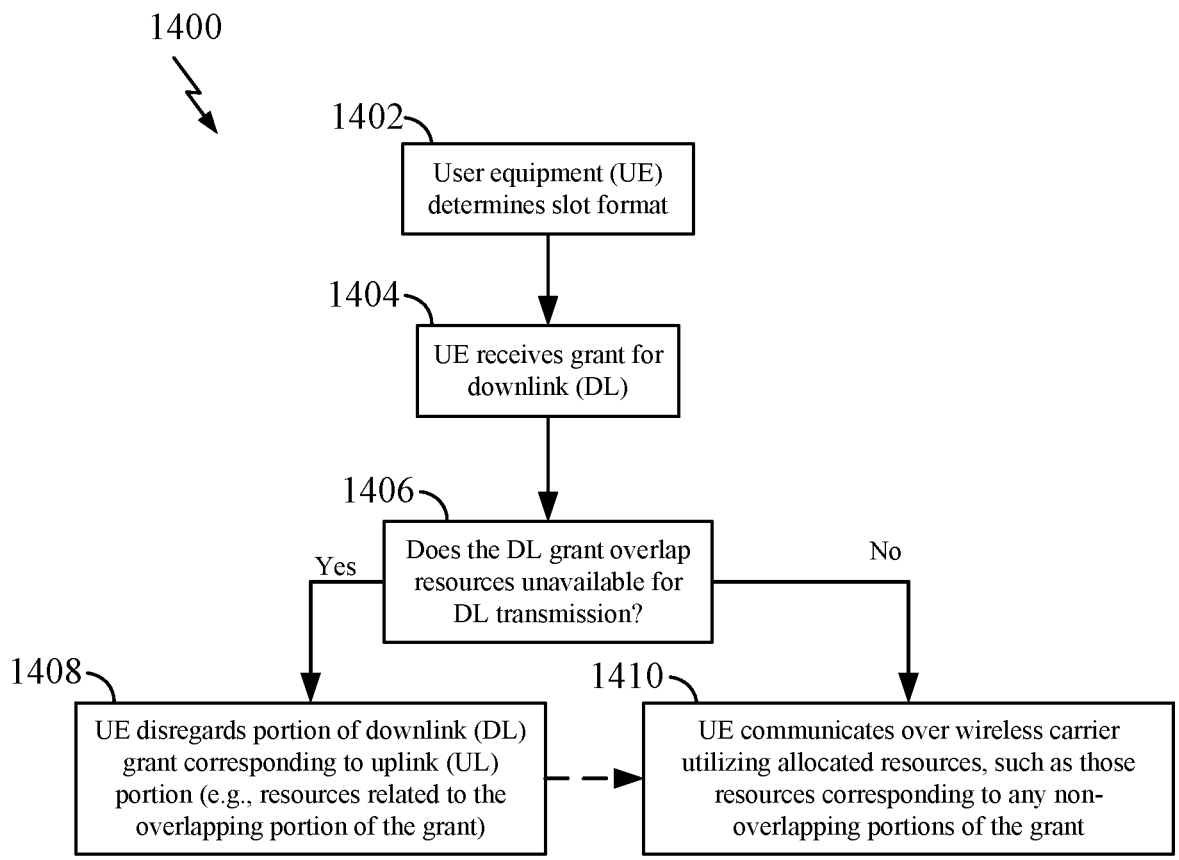
FIG. 14 is a flow chart illustrating an exemplary process for a scheduled entity to implicitly assume that UL resources in a slot are unavailable for DL transmission according to some embodiments.

FIG. 14 is a flow chart illustrating an exemplary process 1400 for a scheduled entity 106 (e.g., a UE) to implicitly assume that UL resources in a slot format are unavailable for DL transmission in accordance with some embodiments. As described herein, a particular implementation may omit some or all illustrated features, and may not require some illustrated features to implement all embodiments. In some examples, the scheduling entity 1000 illustrated in FIG. 10 and/or the scheduled entity 1100 illustrated in FIG. 11 may be configured to carry out the process 1400. In some examples, any suitable apparatus or means for carrying out the functions or algorithm described herein may carry out the process 1400.

At block 1402, a scheduled entity 106 may determine a slot format for one or more slots. In an example, the scheduled entity 106 may receive an indication or configuration message from a scheduling entity 108 (e.g., a BS) sufficient for the scheduled entity 106 to determine a slot format for a given slot. The indication or configuration message may identify at least one UL portion of a slot (e.g., at least one first frequency portion) and at least one DL portion of the slot (e.g., at least one second frequency portion). In an illustrative and non-limiting example, the indication or configuration message may identify at least one first bandwidth part (BWP) as representing a portion of the slot the scheduling entity 108 has designated as being for UL communication (e.g., unavailable for DL communication). In addition, the indication or configuration message may identify at least one second BWP as representing a portion of the slot the scheduling entity 108 has designated as being for DL communication. In such examples, the indication or configuration message may identify the at least one UL portion of a slot and the at least one DL portion of the slot. In another example, the indication or configuration message may identify various frequency portions of the slot that the scheduling entity 108 has designated as being for DL communication and for UL communication. This information may be used when the scheduling entity 108 and the scheduled entity 106 are communicating information (e.g., data, content, etc.) over a particular wireless carrier (e.g., an SBFD carrier) utilizing the slot format, such as when transmitting slots on the wireless carrier according to the slot format.

In some examples, when determining the slot format, the scheduled entity 106 may identify that the UL portion of the slot represents resources impliedly not available for DL transmission. That is, rather than having the scheduling entity 108 provide explicit signaling to this effect, the scheduled entity 106 may implicitly assume that the UL portion of the slot is included in the resources that are not available for DL transmission.

At block 1404, a scheduled entity 106 may receive a type 1 DL grant message for the slot. In an example, the scheduled entity 106 may receive, from the scheduling entity 108, a DL resource allocation for the slot. The scheduled entity 106 may receive the grant message as having a number of RBs or REs (e.g., related to different frequency portions of the slot) that the scheduled entity 106 may consider (e.g., by determining to process) or otherwise disregard (e.g., ignore, forgo to process, omit, discard, exclude, etc.) according to one or more of the various techniques of this disclosure.

At block 1406, the scheduled entity 106 may determine whether the DL grant message overlaps in frequency (e.g., partially or fully) with the resources identified as not available for DL transmission. In an example, the scheduled entity 106 may determine whether any portion of the DL resource allocation for the slot (e.g., the DL grant message) overlaps with resources designated as unavailable for DL communication (e.g., over the SBFD wireless carrier). Alternatively, as described above, the scheduled entity 106 may make this determination when communicating over a wireless carrier by disregarding any portion of the DL grant message that overlaps with the resources designated as unavailable for DL transmission. In an example, block 1406 may represent an optional item (e.g., a descriptive item, or presumably factual item of the particular communication used for the example illustration). In an example, the item may be shown for illustration purposes to show that an overlapping portion may be present in certain instances. This block 1406 may further be shown as included in the example flow chart to indicate how one or more of the various techniques of this disclosure may apply to address certain DL information related to the overlapping portion. As described herein, the techniques of this disclosure address certain DL information related to the overlapping portion in a manner that seeks to avoid portions of the DL transmission from interfering with portions of a UL transmission, when a scheduled entity 106 is utilizing a particular wireless carrier to communicate with a scheduling entity 108.

If the DL grant message overlaps with the resources identified as corresponding to a UL portion in the slot format, then at block 1408, the scheduled entity 106 may disregard REs located within the overlapping portion of the DL grant message. In this way, the scheduled entity 106 may disregard information of the DL grant message corresponding to the UL portion of the slot. In an example, the scheduled entity 106 may communicate over an SBFD wireless carrier utilizing the slot while disregarding (e.g., ignoring, forgoing to process, omitting, discarding, excluding, etc.) REs received in the overlapping portion of the DL grant message (e.g., information related to the overlapping portion). That is, the scheduled entity 106 may communicate over the wireless carrier utilizing the slot format (e.g., using the slot on the carrier configured according to the slot format) while disregarding information related to (e.g., that falls within) the overlapping portion.

If there is no such overlap (i.e., no overlapping portion), then at block 1410, the scheduled entity 106 may utilize the resources allocated in the DL grant message, and may receive and process the corresponding REs. In such examples, the scheduled entity 106 may communicate over the wireless carrier utilizing the slot format while, in such instances, utilizing all resources of the type 1 DL resource allocation for the slot. That is, the scheduled entity 106 may utilize all information corresponding to the REs allocated in the DL grant message without disregarding REs located in any portion of the DL grant message due to an overlapping portion creating a conflict between the slot format and the DL resource allocation.

PDSCH Resource Mapping with RBG-Level Granularity

Figure 15:
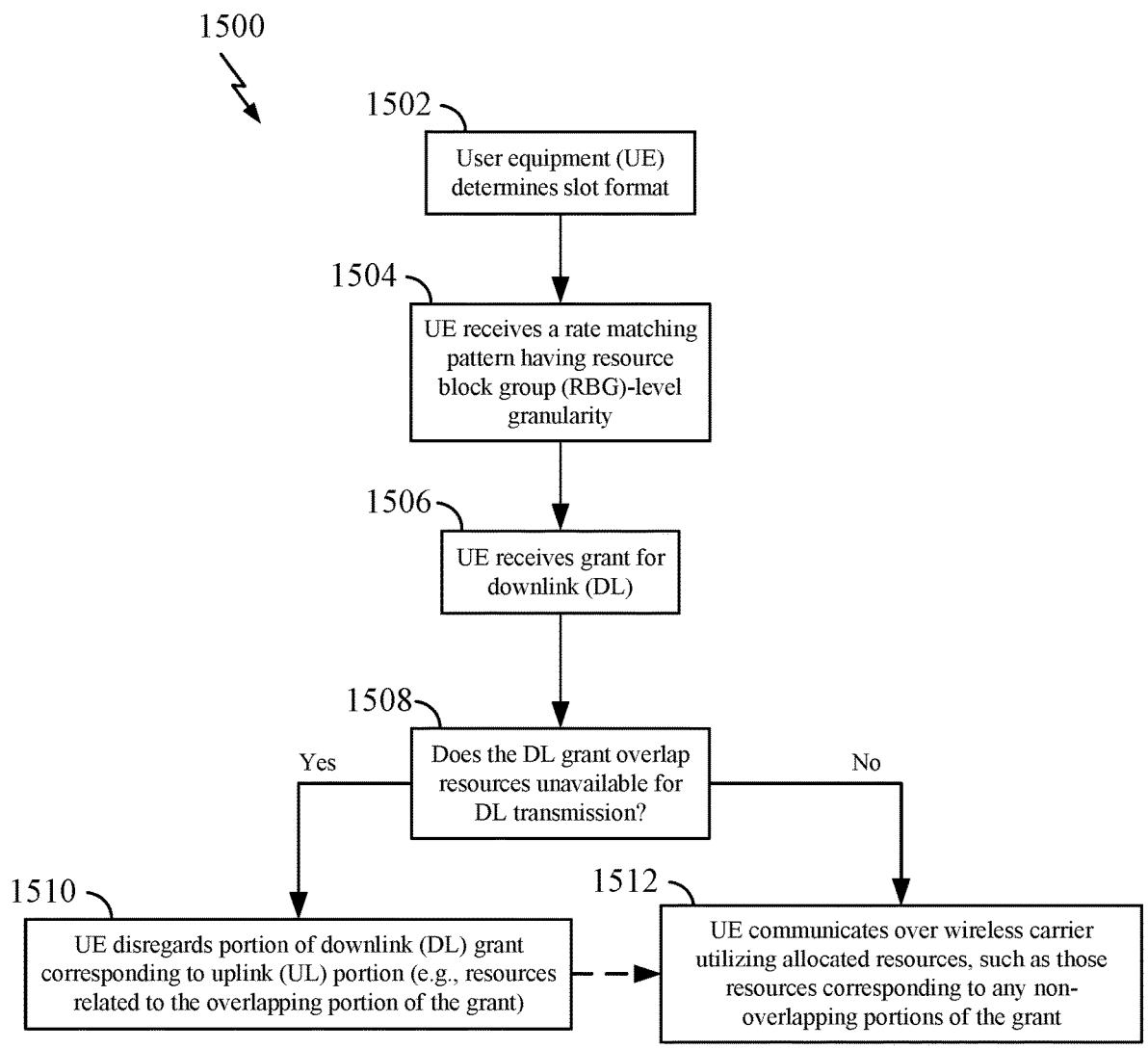
FIG. 15 is a flow chart illustrating an exemplary process for a scheduled entity to utilize a rate matching pattern having resource block group (RBG)-level granularity around a UL portion of a slot according to some embodiments.

FIG. 15 is a flow chart illustrating an exemplary process 1500 for a scheduled entity 106 (e.g., a UE) to utilize a rate matching pattern having resource block group (RBG)-level granularity around a UL portion of a slot (e.g., on an SBFD wireless carrier) in accordance with some embodiments. As described herein, a particular implementation may omit some or all illustrated features, and may not require some illustrated features to implement all embodiments. In some examples, the scheduling entity 1000 illustrated in FIG. 10 and/or the scheduled entity 1100 illustrated in FIG. 11 may be configured to carry out the process 1500. In some examples, any suitable apparatus or means for carrying out the functions or algorithm described herein may carry out the process 1500.

At block 1502, a scheduled entity 106 may determine a slot format for one or more slots. In an example, the scheduled entity 106 may receive an indication or configuration message from the scheduling entity 108 (e.g., a BS) sufficient for the scheduled entity 106 to determine a slot format for a given slot. The indication or configuration message may identify at least one UL portion of a slot (e.g., a first frequency portion) and at least one DL portion of the slot (e.g., a second frequency portion).

At block 1504, the scheduled entity 106 may receive a rate matching pattern having resource block group (RBG)-level granularity. In an example, the rate matching pattern may include a bitmap string indicating RBGs corresponding to those unavailable resources. In such examples, the rate matching pattern may correspond to the UL portion of the slot (e.g., on the SBFD wireless carrier).

In existing 3GPP specifications for 5G NR (e.g., TS 38.214), a scheduling entity 108 may address an overlap between a frequency domain resource allocation (FDRA) for DL and resources set aside for UL communication by including the resources of the UL portion as resources not available for DL transmission. However, these specifications may, in some instances, only provide for such inclusion of resources (e.g., as being unavailable) by having the scheduling entity 108 provide to the scheduled entity 106 a bitmap string corresponding to those unavailable resources, with the bits in the bitmap representing either RE-level or RB-level granularity. In an example, a bitmap string may utilize one bit per RE or one bit per RB to indicate a set of resources unavailable for DL transmission. That is, one bit may be used for each RE and/or each RB in a bitmap string, where the bitmap string is of a particular length as determined from the number of REs or RBs corresponding to the set of resources unavailable for DL transmission. Because the amount of resources set aside for the UL portion may be relatively large, RE-level or RB-level granularity can cause a large amount of control signaling overhead.

In an aspect of the present disclosure, a scheduling entity 108 may provide a rate matching pattern to a scheduled entity 106 with RBG-level granularity. With RBG-level granularity, the amount of control signaling overhead at the scheduling entity 108 may effectively be reduced. That is, an RBG may include a plurality of RBs, such that using a bitmap to indicate bits for RBGs rather than for RBs may effectively reduce the amount of control signaling overhead (e.g., by utilizing less bits for each bitmap). In some examples, a rate matching pattern may be configured to utilize a combination of RBG-level granularity and RB-level or RE-level granularity to provide more or less granularity for various portions of the slot having the particular slot format.

In another implementation example, the scheduled entity 106 may receive the rate matching pattern in a control message. In such examples, the control message may further identify a starting resource and length of resources utilizing different granularity levels. Accordingly, the rate matching pattern may provide a bitmap identifying certain RBGs as corresponding to resources unavailable for DL transmission, with the start and length indicator providing ancillary or additional support for the scheduled entity 106 to identify a full set of resources unavailable for DL transmission. In an illustrative and non-limiting example, the scheduled entity 106 may utilize a rate matching pattern specifying an RBG level of granularity to determine a first portion of resources unavailable for DL transmission. In addition, the scheduled entity 106 may utilize start and length indicators having a different level of granularity (e.g., an RB-level of granularity, an RE-level of granularity, etc.) to determine a second portion of resources unavailable for DL transmission. The second portion may correspond to one or more adjacent GB portions that implicate less resources than the UL portion and thus the scheduled entity 106 may benefit from utilizing different levels of granularity and/or from utilizing a rate matching pattern to determine less than the full set of resources unavailable for DL transmission. In this way, the scheduled entity 106 may determine a full set of resources unavailable for DL transmission as including resources from both these first and the second portions of resources determined to be unavailable for DL transmission. As such, the scheduled entity 106 may utilize the rate matching pattern and the start and length indicators to determine that the overlapping portion corresponds to the resources unavailable for DL transmission.

In any number of different implementation examples described herein, the scheduled entity 106 may determine that the rate matching pattern corresponds to an overlapping portion of a DL resource allocation, that at least one GB adjacent to the overlapping portion of the DL resource allocation comprises resources unavailable for DL transmission, that resources identified in a control message correspond to the overlapping portion of the DL resource allocation, and/or that the UL portion generally includes resources unavailable for DL transmission. That is, based on any combination of one or more of the disclosed techniques, the scheduled entity 106 may determine a full set of resources unavailable for DL transmission. Of course, the scheduled entity 106 may determine to utilize a rate matching pattern to determine the full set of resources unavailable for DL transmission, where the rate matching pattern has RBG-level granularity as described further herein. The combination of techniques may depend on the particular application, slot format, or other parameters.

In a given implementation, a scheduling entity 108 may configure the rate matching pattern on a per serving cell basis (e.g., utilizing a ServingCellConfig IE). In another example, a scheduling entity 108 may configure the rate matching pattern on a dynamic, per bandwidth part (BWP) basis (e.g., utilizing a PDSCH-Config IE).

In the frequency domain, a scheduling entity 108 may provide the rate matching frequency domain pattern as a bitmap, e.g., with one bit per RBG. In another example, a scheduling entity 108 may provide the rate matching frequency domain pattern in accordance with the RBGs of the UL BWP. In some examples, the scheduling entity 108 may utilize one or more RBGs to indicate the rate matching pattern.

In the time domain, a scheduling entity 108 may provide the rate matching time domain pattern as a bitmap, e.g., with one bit per OFDM symbol (e.g., utilizing 14 bits per slot, or 7 bits per mini-slot, etc.). In another example, a scheduling entity 108 may provide the rate matching time domain pattern in accordance with a periodicity and a pattern. For example, a scheduling entity 108 may provide a scheduled entity 106 with N bits that map to N slots. In such examples, the scheduling entity 108 may use a '1,' for example, to indicate a slot utilizing an indicated time domain pattern.

At block 1506, the scheduled entity 106 may receive a type 1 DL grant message for the slot. In an example, the scheduled entity 106 may receive, from the scheduling entity 108, a DL resource allocation for the slot. The scheduled entity 106 may receive the grant as having a number of RBs or REs (e.g., related to different frequency portions of the slot) that the scheduled entity 106 may consider (e.g., by determining to process) or otherwise, disregard (e.g., ignore, forgo to process, omit, discard, exclude, etc.) according to one or more of the various techniques of this disclosure.

At block 1508, the scheduled entity 106 may determine whether the DL grant message overlaps in frequency (e.g., partially or fully) with the resources designated as not available for DL transmission. In an example, the scheduled entity 106 may determine whether any portion of the DL resource allocation for the slot (e.g., the DL grant message) overlaps with resources designated as unavailable for DL communication (e.g., over the SBFD wireless carrier). Alternatively, as described above, the scheduled entity 106 may make this determination when communicating over a wireless carrier by disregarding any portion of the DL grant message that overlaps with the resources designated as unavailable for DL transmission. In an example, block 1508 may represent an optional item (e.g., a descriptive item, or presumably factual item of the particular communication used for the example illustration). In an example, the item may be shown for illustration purposes to show that an overlapping portion may be present in certain instances. This block 1508 may further be shown as included in the example flow chart to indicate how one or more of the various techniques of this disclosure may apply to address certain DL information related to the overlapping portion. As described herein, the techniques of this disclosure address certain DL information related to the overlapping portion in a manner that seeks to avoid portions of the DL transmission from interfering with portions of a UL transmission, when a scheduled entity 106 is utilizing a particular wireless carrier to communicate with a scheduling entity 108.

If the DL grant message overlaps with the resources designated as unavailable for DL transmission, then at block 1510, the scheduled entity 106 may disregard REs located within the overlapping portion of the DL grant message. In this way, the scheduled entity 106 may disregard information of the DL grant message corresponding to the UL portion of the slot. In an example, the scheduled entity 106 may communicate over an SBFD wireless carrier utilizing the slot while disregarding (e.g., ignoring, forgoing to process, omitting, discarding, excluding, etc.) REs received in the overlapping portion of the DL grant message (e.g., information related to the overlapping portion). That is, the scheduled entity 106 may communicate over the wireless carrier utilizing the slot format (e.g., using the slot on the carrier configured according to the slot format) while disregarding information related to (e.g., that falls within) the overlapping portion.

If there is no such overlap (i.e., no overlapping portion), then at block 1512, the scheduled entity 106 may utilize the resources allocated in the DL grant message, and may receive and process the corresponding REs. In such examples, the scheduled entity 106 may communicate over the wireless carrier utilizing the slot format while, in such instances, utilizing all resources of the type 1 DL resource allocation for the slot. That is, the scheduled entity 106 may utilize all information corresponding to the REs allocated in the DL grant message without disregarding REs located in any portion of the DL grant message due to an overlapping portion creating a conflict between the slot format and the DL resource allocation.

Indicator of a Set of Unavailable Resources for Downlink (DL)

Figure 16:
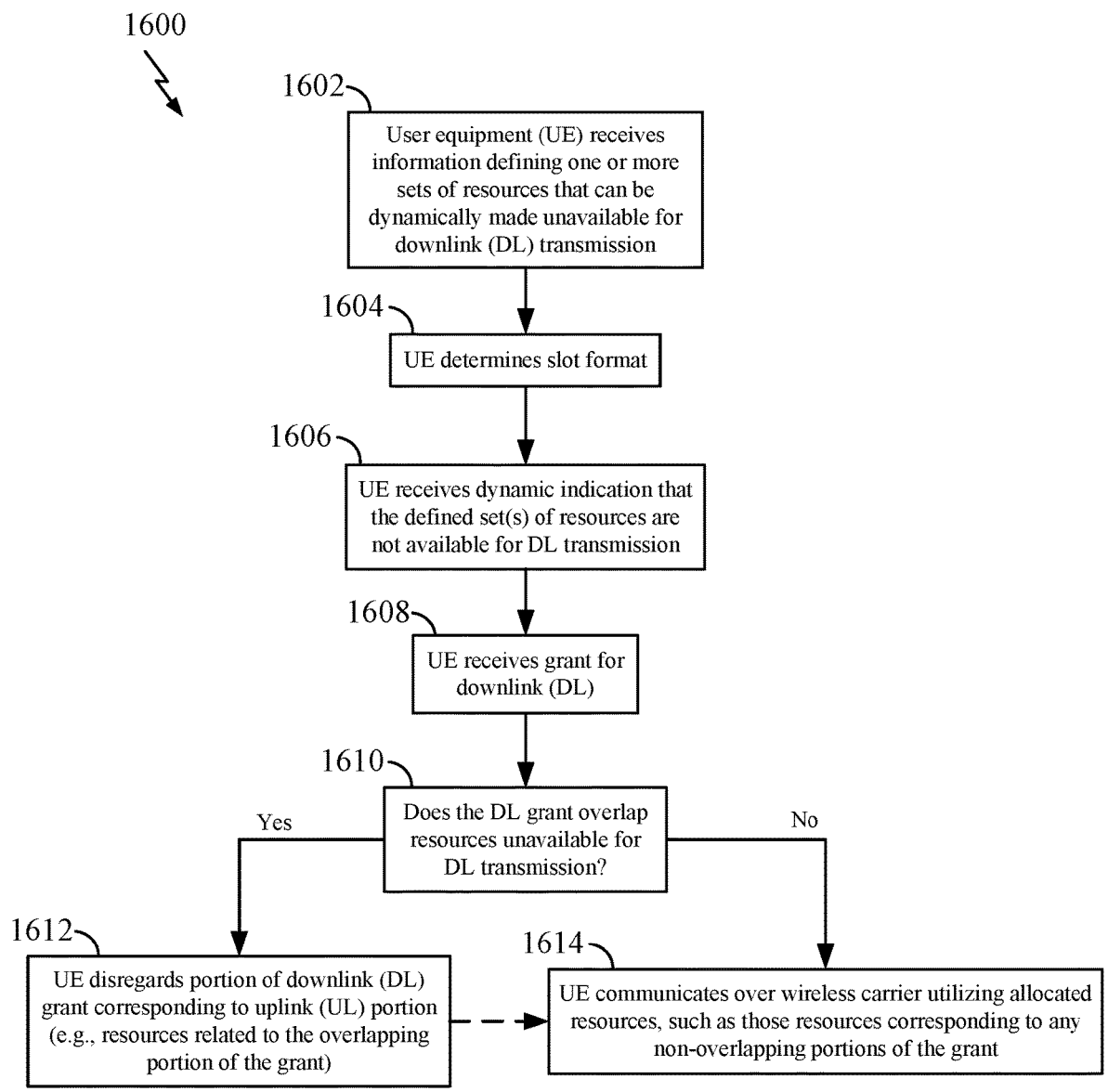
FIG. 16 is a flow chart illustrating an exemplary process for dynamically indicating that a preconfigured set of resources is unavailable for DL transmission according to some embodiments.

FIG. 16 is a flow chart illustrating an exemplary process 1600 for dynamically indicating a preconfigured set of resources unavailable for downlink (DL) transmission in accordance with some aspects of the present disclosure. As described herein, a particular implementation may omit some or all illustrated features, and may not require some illustrated features to implement all embodiments. In some examples, the scheduling entity 1000 illustrated in FIG. 10 and/or the scheduled entity 1100 illustrated in FIG. 11 may be configured to carry out the process 1600. In some examples, any suitable apparatus or means for carrying out the functions or algorithm described herein may carry out the process 1600.

At block 1602, a scheduled entity 106 (e.g., a UE) may receive information defining sets of resources that can be dynamically made unavailable for DL transmission. In an example, a scheduling entity 108 (e.g., a BS) may provide the scheduled entity 106 with information that defines those resources that, when SBFD is utilized, the scheduling entity 108 may dynamically make unavailable for DL transmission (e.g., for PDSCH). In this way, the scheduled entity 106 may determine one or more sets of resources configured for being dynamically made either unavailable or available for DL transmission. That is, the scheduled entity 106 may receive the one or more resource sets from the scheduling entity 108 that the scheduling entity 108 indicates as being configured for being dynamically made available and unavailable in a slot for DL communication.

At block 1604, the scheduled entity 106 may determine a slot format for one or more slots. In an example, the scheduled entity 106 may receive an indication or configuration message from the scheduling entity 108 sufficient for the scheduled entity 106 to determine a slot format for a given slot. The indication or configuration message may identify a UL portion of a slot (e.g., a first frequency portion) and at least one DL portion of the slot (e.g., a second frequency portion). In some examples, the slot format configuration may indicate the sets of resources that can be dynamically made available for DL transmission.

At block 1606, the scheduled entity 106 may receive a dynamic indication that one or more set(s) of resources are unavailable for DL transmission. In an example, the scheduling entity 108 may dynamically indicate the activation of one or more of the sets of resources identified at block 1602 (e.g., by transmitting a suitable DCI or a MAC-CE to a scheduled entity 106). When the scheduled entity 106 receives the dynamic indication from the scheduling entity 108, the scheduled entity 106 may in turn designate a set (e.g., of the preconfigured sets) of resources as unavailable for DL transmission. In some examples, a scheduling entity 108 and scheduled entity 106 may utilize such dynamic indication signals when the scheduling entity 108 and scheduled entity 106 accept that a particular DL transmission (e.g., an SSB) may overlap with some, or all, of the UL portion of the slot. That is, even if overlapping with the UL portion on a wireless carrier, the dynamic indication may be useful, for example, in a case where a scheduling entity 108 is to transmit an SSB over the carrier.

At block 1608, the scheduled entity 106 may receive a type 1 DL grant message for the slot. In an example, the scheduled entity 106 may receive, from the scheduling entity 108, a DL resource allocation for the slot. The scheduled entity 106 may receive the grant as having a number of RBs or REs (e.g., related to different frequency portions of the slot) that the scheduled entity 106 may consider (e.g., by determining to process) or otherwise, disregard (e.g., ignore, forgo to process, omit, discard, exclude, etc.) according to one or more of the various techniques of this disclosure.

At block 1610, the scheduled entity 106 may determine whether the DL grant message overlaps in frequency (e.g., partially or fully) with the resources designated as not available for DL transmission. In an example, the scheduled entity 106 may determine whether any portion of the DL resource allocation for the slot (e.g., the DL grant message) overlaps with resources designated as unavailable for DL communication (e.g., over the SBFD wireless carrier). Alternatively, as described above, the scheduled entity 106 may make this determination when communicating over a wireless carrier by disregarding any portion of the DL grant message that overlaps with the resources designated as unavailable for DL transmission. In an example, block 1610 may represent an optional item (e.g., a descriptive item, or presumably factual item of the particular communication used for the example illustration). In an example, the item may be shown for illustration purposes to show that an overlapping portion may be present in certain instances. This block 1610 may further be shown as included in the example flow chart to indicate how one or more of the various techniques of this disclosure may apply to address certain DL information related to the overlapping portion. As described herein, the techniques of this disclosure address certain DL information related to the overlapping portion in a manner that seeks to avoid portions of the DL transmission from interfering with portions of a UL transmission, when a scheduled entity 106 is utilizing a particular wireless carrier to communicate with a scheduling entity 108.

If the DL grant message overlaps with the resources designated as unavailable for DL transmission, then at block 1612, the scheduled entity 106 may disregard REs located within the overlapping portion of the DL grant message. In this way, the scheduled entity 106 may disregard information of the DL grant message corresponding to the UL portion of the slot. In an example, the scheduled entity 106 may communicate over an SBFD wireless carrier utilizing the slot while disregarding (e.g., ignoring, forgoing to process, omitting, discarding, excluding, etc.) REs received in the overlapping portion of the DL grant message (e.g., information related to the overlapping portion). That is, the scheduled entity 106 may communicate over the wireless carrier utilizing the slot format (e.g., using the slot on the carrier configured according to the slot format) while disregarding information related to (e.g., that falls within) the overlapping portion.

If there is no such overlap (i.e., no overlapping portion), then at block 1614, the scheduled entity 106 may utilize the resources allocated in the DL grant message, and may receive and process the corresponding REs. In such examples, the scheduled entity 106 may communicate over the wireless carrier utilizing the slot format while, in such instances, utilizing all resources of the type 1 DL resource allocation for the slot. That is, the scheduled entity 106 may utilize all information corresponding to the REs allocated in the DL grant message without disregarding REs located in any portion of the DL grant message due to an overlapping portion creating a conflict between the slot format and the DL resource allocation.

While generally described with reference to a multitude of figures, the techniques of this disclosure are not so limited. The scheduled entity 106 may communicate over a wireless carrier utilizing the slot format while disregarding information related to an overlapping portion based on any combination of the one or more techniques described, for example, with reference to FIGS. 12-16.

Figure 17:
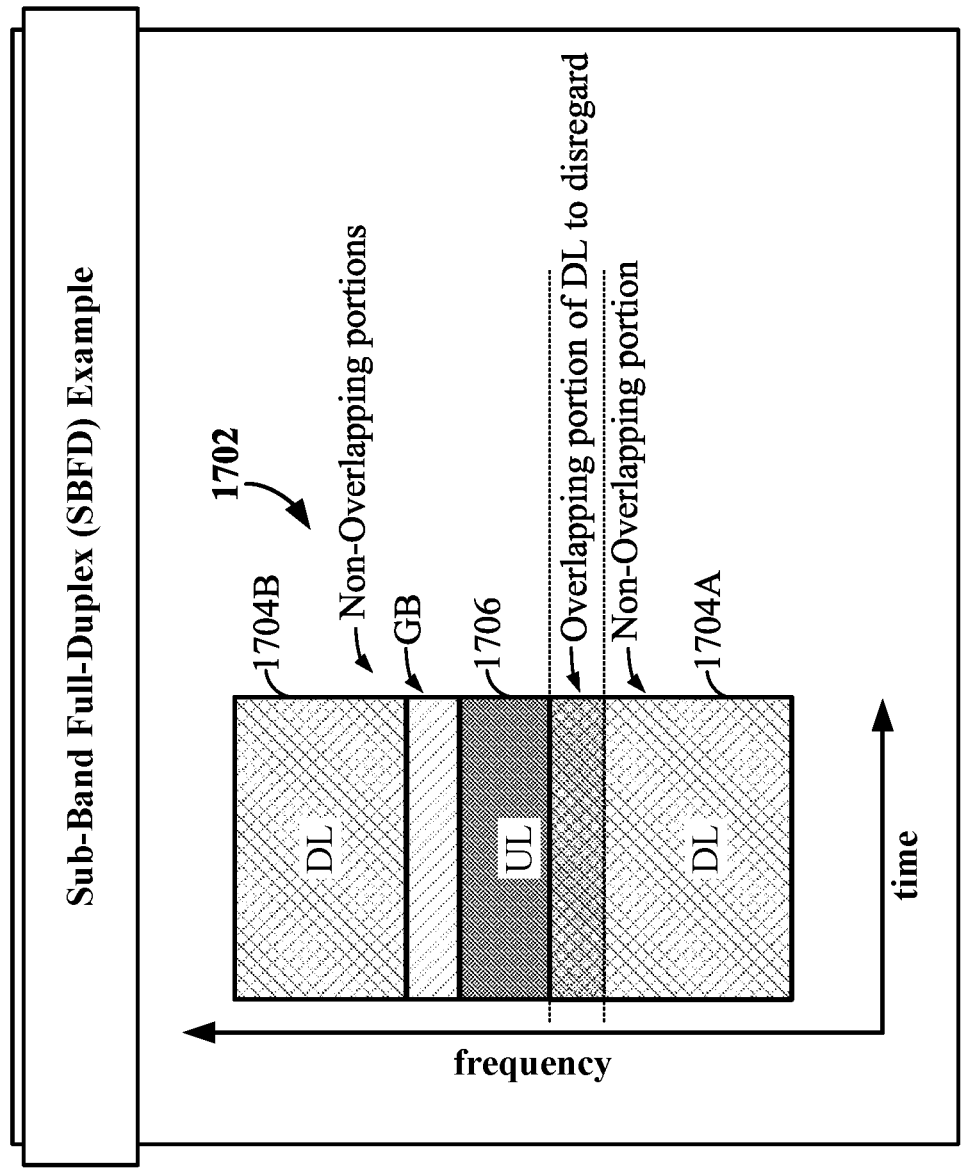
FIG. 17 is a schematic illustration of SBFD communication including an overlapping portion in frequency between UL and DL portions according to some embodiments.

FIG. 17 is a schematic illustration of sub-band full-duplex (SBFD) communication including an overlapping portion (in frequency) between uplink (UL) and downlink (DL) communications. The overlapping portion, in this example, poses a conflict that the scheduled entity 106 is configured to identify and/or resolve in accordance with one or more of the various techniques of this disclosure. In an example, the scheduled entity 106 (e.g., a UE) may identify the overlap using any one or more of the techniques described with reference to FIGS. 12-16.

As shown, the overlapping portion is between UL and DL frequency portions of a slot for an SBFD carrier 1702. In the illustrated example, the DL frequency portions 1704A and 1704B of the slot and the UL frequency portion 1706 of the slot are separated from one another in frequency in some non-overlapping portions of the slot. The DL resource allocation in this example, however, overlaps at least partially with the UL frequency portion 1706, as shown conceptually where at least some of the DL frequency portion 1704A overlaps with the UL frequency portion 1706, thereby impinging on or implicating resources designated as unavailable for DL transmission. In accordance with any one or more of the various techniques of this disclosure, the scheduled entity 106 may determine to disregard any DL data related to the DL resource allocation that the scheduled entity 106 determines is in the overlapping portion (e.g., pursuant to the processes described with reference, for example, to any one or more of FIGS. 12-16). In this way, the scheduled entity 106 may communicate over the SBFD carrier 1702 utilizing the slot while disregarding any information related to the overlapping portion of the DL frequency portion 1704A. In addition, the scheduled entity 106 may process any information related to non-overlapping portions, such as the entirety of information related to DL frequency portions 1704B and at least some resource elements (REs) of DL frequency portion 1704A that are not overlapping with UL frequency portion 1706.

In such instances, the scheduled entity 106 may disregard information related to the overlapping portion of DL frequency portion 1704A and UL frequency portion 1706. In this way, the scheduled entity 106 may provide UL transmissions in the UL frequency portion 1706 including using bandwidth parts (BWPs) related to the overlapping portion of UL frequency portion 1706, without compromising the integrity of the UL transmission in the otherwise overlapping portion.

In this example, the slot format may be such that a guard period (GP) may further be located between UL frequency portion 1706 and DL frequency portion 1704A, which may be in the overlapping portion as well. In such instances, the scheduled entity 106 may disregard portions of DL 1704A that overlap with a GP between UL frequency portion 1706 and DL frequency portion 1704A, in accordance with one or more of the various techniques of this disclosure. In some examples, the carrier shown may represent portions of a carrier (e.g., a mixed bandwidth part (BWP) of a carrier) or a whole carrier, depending on the implementation.

Aspects of the present disclosure provide apparatus, methods, processing systems, and computer readable media for resolving conflicts between a downlink (DL) resource allocation (e.g., using type 1 DL resource allocation) and resources in a slot designated as not available for DL transmission.

The following description provides examples of a user equipment (UE) and a scheduling entity coordinating which information the UE is to process based on where the information appears in a slot relative to other portions of the slot, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the present disclosure is intended to cover such an apparatus or method which is practiced using other structure, functionality, or structure and functionality in addition to, or other than, the various aspects of the disclosure set forth herein. It should be understood that any aspect of the disclosed technology may be embodied by one or more elements of a claim.

The present disclosure provides several mechanisms and algorithms for resolving a potential conflict that may arise for a DL frequency domain resource allocation (FDRA) type 1 in sub-band full-duplex (SBFD), in which the allocated DL resources overlap with resources that a slot format has designated for uplink (UL) communication. While described with reference to DL resource allocation type 1, in some examples throughout the disclosure, this disclosure is not so limited, and a person of ordinary skill in the art should understand how one or more of the techniques of this disclosure may apply as well to other wireless carriers or other resource allocation types (e.g., UL resource allocation, non-type 1 resource allocations, SL resource allocation, etc.).

In one illustrative and non-limiting example, a set of UEs may communicate over a sidelink (SL) utilizing the techniques of this disclosure, where in such examples a first UE may operate as a scheduling entity and another UE may operate as a scheduled entity, such that the set of UEs may exchange information that allows for the identification of resources in overlapping portions related to frequency portions allocated for the SL communication (e.g., at least one first bandwidth part (BWP)) in a first direction relative to a first UE, and frequency portions allocated for the SL communication (e.g., at least one second bandwidth part (BWP)) in the second direction relative to the first UE. These directions may be likened, in certain instances, to DL communications/directions and UL communications/directions to determine when a conflict may exist between communications in different directions.

In an example, conflicts may arise between DL resource allocations and a slot format when utilizing type 1 DL resource allocation. A scheduling entity 108, as such, may indicate a set of unavailable resources in the form of a bitmap. These bitmaps can be quite large when used as such and may impose significant overhead if not used in a limited manner, such as by using one bit per resource block group (RBG) for RBG-level granularity rate matching, for example. Accordingly, one or more of the various techniques of this disclosure provide for the resolving of such conflicts by determining whether portions of the DL resource allocation overlap with certain resources of a slot designated as unavailable for DL transmission (configured and/or dynamically indicated) and then disregarding (e.g., ignoring) information included in those overlapping portions while communicating over a wireless carrier using the slot format.

In some aspects, the present disclosure provides apparatus, methods, processing systems, and computer-readable media for determining that an overlapping portion comprises resources unavailable for DL transmission. The present disclosure provides a multitude of examples and processes, for example, describing how a scheduled entity may determine that such overlapping portions consist of resources unavailable for DL transmission. Although described with reference to different figures, in some instances, a scheduled entity may employ one or combinations of such processes to facilitate communication over the SBFD wireless carrier. Further aspects of the present disclosure provide apparatus, methods, processing systems, and computer-readable media for communicating over a wireless carrier utilizing the slot format while disregarding (e.g., ignoring) information related to the overlapping portion.

Scheduling Entity

Figure 10:
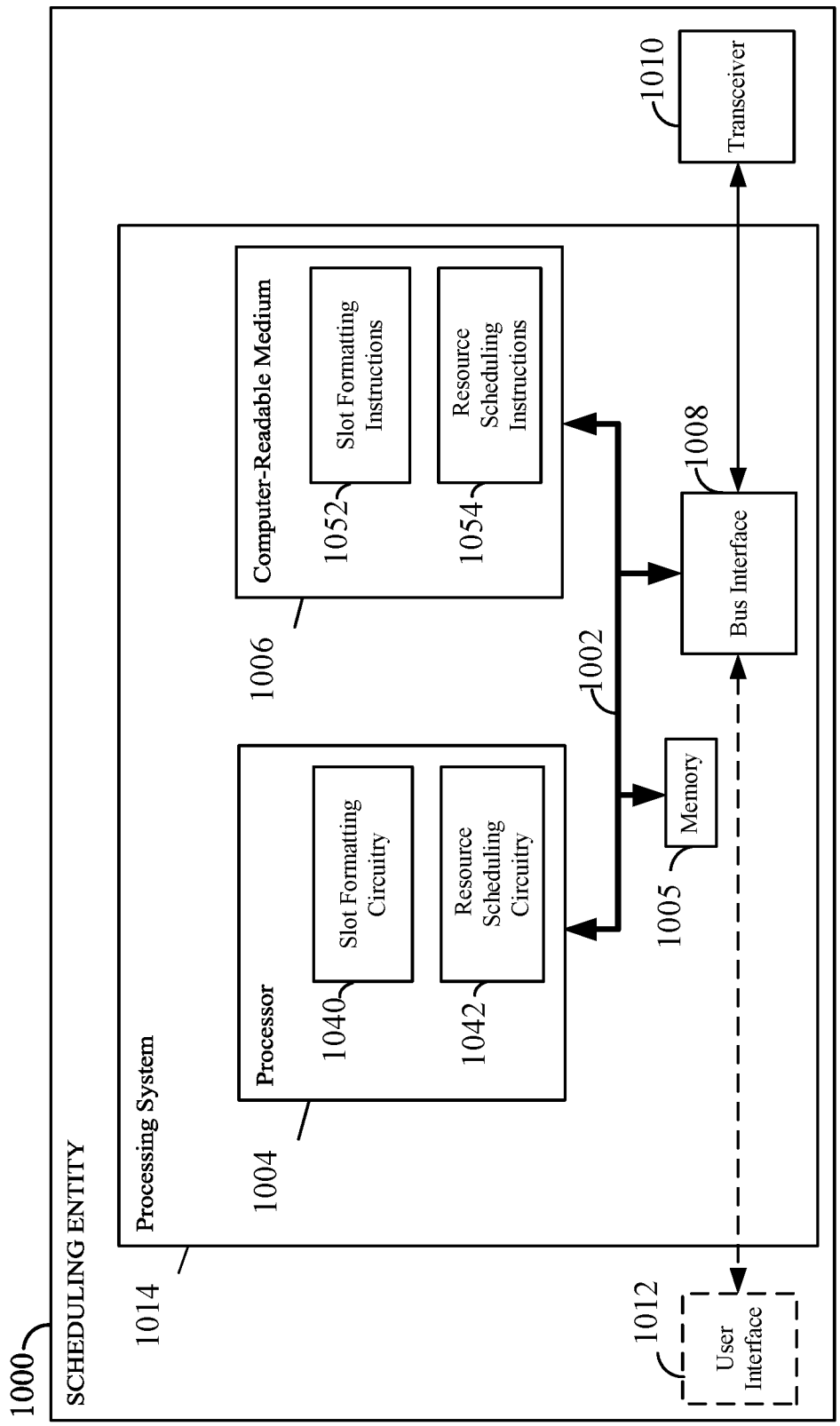
FIG. 10 is a block diagram conceptually illustrating an example of a hardware implementation for a scheduling entity according to some embodiments.

FIG. 10 is a block diagram conceptually illustrating an example of a hardware implementation for a scheduling entity 1000 employing a processing system 1014. In accordance with various aspects of the present disclosure, the processing system 1014 may include an element, or any portion of an element, or any combination of elements having one or more processors 1004. The scheduling entity 1000 may be an example of a scheduling entity 108 (e.g., a BS) as described herein with reference, for example, to FIGS. 1, 2, and/or 4. For example, the scheduling entity 1000 may be a BS as illustrated in any one or more of FIGS. 1, 2, and/or 4. In another example, the scheduling entity 1000 may be a user equipment (UE) as described with reference, for example, to FIGS. 1 and/or 2.

The scheduling entity 1000 includes a processing system 1014 having one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be configured (e.g., in coordination with the memory 1005 and the transceiver 1010) to implement any one or more of the processes and procedures described herein and illustrated in FIGS. 12-17.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided. Of course, such a user interface 1012 is optional, and some examples, such as a base station, may omit it.

In some aspects of the present disclosure, the processor 1004 may include slot formatting circuitry 1040 configured (e.g., in coordination with the memory 1005 and the transceiver 1010) for various functions, including, for example, determining and communicating to one or more scheduled entities 106 a slot format, including respective portions of a slot for UL communication, for DL communication, or, in some examples, resources that can be flexibly allocated for either UL or DL communications. The processor 1004 may further include resource scheduling circuitry 1042 configured (e.g., in coordination with the memory 1005 and the transceiver 1010) for various functions, including, for example, determining and communicating to one or more scheduled entities 106 a DL resource allocation (e.g., a grant message) for one or more wireless carriers (e.g., for one or more slots).

The processor 1004 is responsible for managing the bus 1002 and general processing, including the execution of software stored on the computer-readable medium 1006. The software, when executed by the processor 1004, causes the processing system 1014 to perform the various functions described herein for any particular apparatus. The processor 1004 may also use the computer-readable medium 1006 and the memory 1005 for storing data that the processor 1004 manipulates when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1006 may store computer-executable code that includes slot formatting instructions 1052 that configure a scheduling entity 1000 for various functions. For example, the slot formatting instructions 1052 may be configured to cause a scheduling entity 1000 to implement one or more of the functions described in relation to FIGS. 12-17, including, e.g., block 1202, determining a slot format for a slot on an SBFD wireless carrier, determining a UL frequency portion of a slot, determining resources of the slot indicated as unavailable for DL transmission, determining the UL portion is unavailable for DL transmission, etc. The computer-readable storage medium 1006 may store computer-executable code that includes resource scheduling instructions 1054 that configure a scheduling entity 1000 for various functions, including, e.g., receiving a type 1 DL resource allocation, determining the DL resource allocation has an overlapping portion with a portion of a slot unavailable for DL transmission and facilitating communication over the SBFD wireless carrier while disregarding (e.g., ignoring) information received with the DL resource allocation that relates to the overlapping portion.

The previous description is provided to enable any person skilled in the art to practice the various functions, including, e.g., facilitating wireless communication between a scheduling entity 108 and a scheduled entity 106 while using limited signaling exchanged between entities to reduce overhead and overlaps between UL and DL communications on an SBFD wireless carrier utilizing DL type 1 FDRA.

Of course, in examples disclosed herein, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-4, and utilizing, for example, the processes and/or algorithms described herein in relation to FIGS. 12-17.

Scheduled Entity

Figure 11:
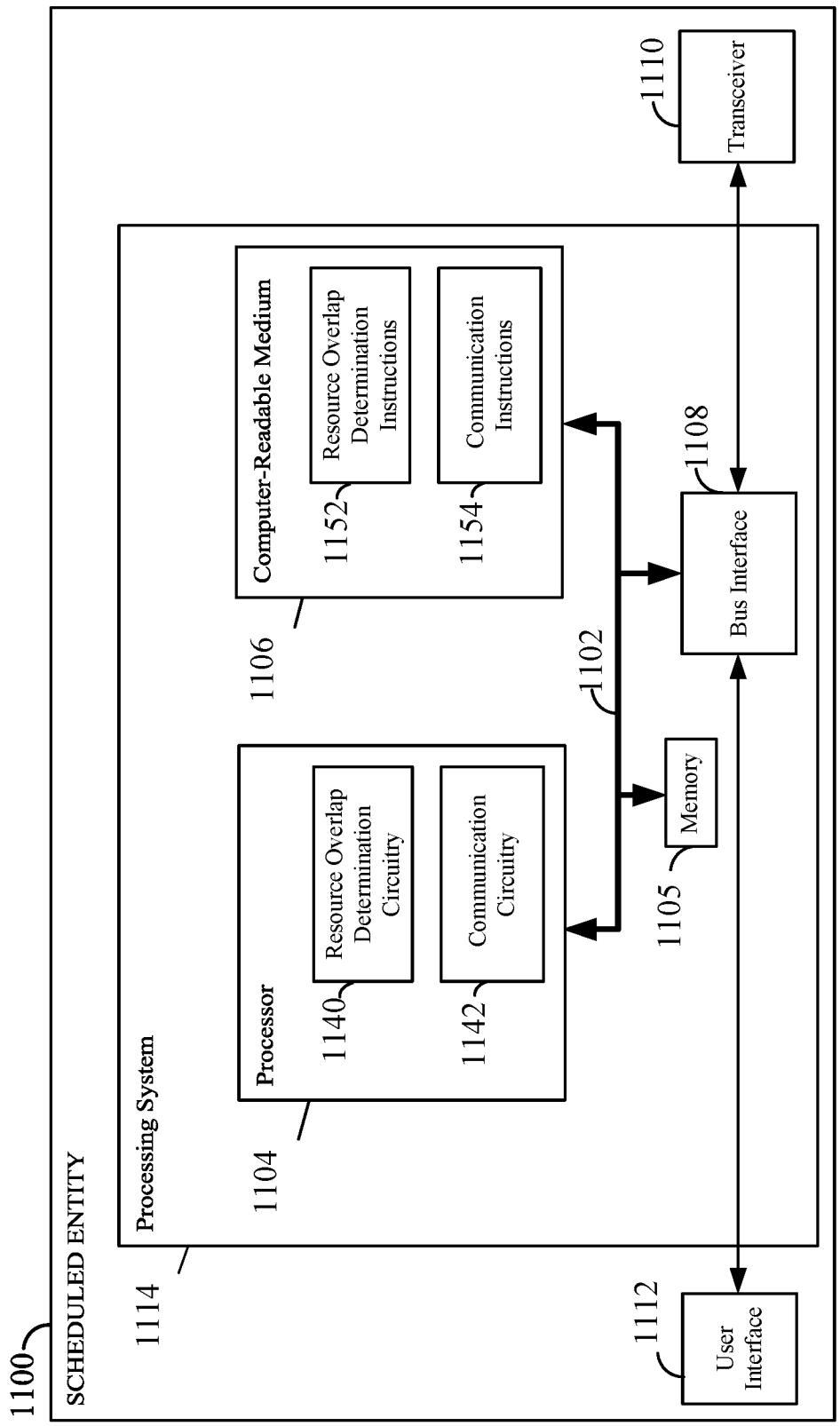
FIG. 11 is a block diagram conceptually illustrating an example of a hardware implementation for a scheduled entity according to some embodiments.

FIG. 11 is a block diagram conceptually illustrating an example of a hardware implementation for an exemplary scheduled entity 1100 employing a processing system 1114. In accordance with various aspects of the present disclosure, the processing system 1114 may include an element, or any portion of an element, or any combination of elements having one or more processors 1104. The scheduled entity 1100 may be an example of a scheduled entity 106 (e.g., a UE) as described herein with reference, for example, to FIGS. 1 and/or 2.

The scheduled entity 1100 includes a processing system 1114 having one or more processors 1104. The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include a user interface 1112 and a transceiver 1110 substantially similar to those described with reference to FIG. 10. That is, the processor 1104, as utilized in a scheduled entity 1100, may be configured (e.g., in coordination with the memory 1105 and the transceiver 1110) to implement any one or more of the processes described herein and illustrated in FIGS. 12-17.

In some aspects of the present disclosure, the processor 1104 may include resource overlap determination circuitry 1140 configured (e.g., in coordination with the memory 1105 and the transceiver 1110) for various functions, including, for example, determining that a DL resource allocation at least partially overlaps in frequency (e.g., fully/partially-overlapped) with a portion of a slot that a slot format indicates is for UL communication, and determining that the overlapping portion consists of resources unavailable for DL transmission. For example, the resource overlap determination circuitry 1140 may be configured (e.g., in coordination with the memory 1105 and the transceiver 1110) for various functions, including, for example, those described in relation to FIGS. 12-17. The processor 1104 may further include communication circuitry 1142 configured (e.g., in coordination with the memory 1105 and the transceiver 1110) for various functions, including, for example, communicating over a wireless air interface (e.g., via one or more wireless carriers).

And further, the computer-readable storage medium 1106 may store computer-executable code that includes resource overlap determination instructions 1152 that configure a scheduled entity 1100 configured (e.g., in coordination with the memory 1105 and the transceiver 1110) for various functions, including, for example, those described in relation to FIGS. 12-17. The computer-readable storage medium 1106 may further store computer-executable code that includes communication instructions 1154 that configure a scheduled entity 1100 configured (e.g., in coordination with the memory 1105 and the transceiver 1110) for various functions, including, for example, communicating over a wireless air interface (e.g., communicating over a wireless carrier utilizing one or more slots having one or more slot formats).

In one configuration, the scheduled entity 1100 for wireless communication includes means for determining a slot format of a slot on an SBFD wireless carrier, means for determining that a DL resource allocation for the slot has an overlapping portion where at least a portion of the DL resource allocation overlaps with a UL portion, where the UL portion has resources indicated as unavailable for DL transmission, and means for utilizing the slot format to communicate over the SBFD wireless carrier while disregarding (e.g., ignoring, forgoing to process, etc.) certain information related REs in the overlapping portion. In one aspect, the aforementioned means may be the processing system 1114 shown in FIG. 11 configured to perform the functions recited by the aforementioned means. In another aspect, the aforementioned means may be a circuit or any apparatus configured to perform the functions recited by the aforementioned means.

Of course, in examples disclosed herein, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-4, and utilizing, for example, the processes and/or algorithms described herein in relation to FIGS. 12-17. In any case, the previous description is provided to enable any person skilled in the art to practice the various aspects described herein.

FURTHER EXAMPLES HAVING A VARIETY OF FEATURES

Example 1: A method, apparatus, system, and non-transitory computer-readable medium for receiving information indicating a slot format, the information identifying a first frequency portion of a slot for uplink communication and a second frequency portion of the slot for downlink communication; receiving a downlink resource allocation for the slot, the downlink resource allocation comprising an overlapping portion wherein at least a portion of the downlink resource allocation overlaps with at least a portion of the first frequency portion of the slot for uplink communication; determining that the overlapping portion consists of resources unavailable for downlink transmission; and communicating over a wireless carrier utilizing the slot while ignoring information received in the overlapping portion.

Example 2: A method, apparatus, system, and non-transitory computer-readable medium of Example 1, further including receiving a control message identifying resources in the slot corresponding to the first frequency portion of the slot for uplink communication, wherein the determining that the overlapping portion consists of resources unavailable for downlink transmission comprises determining that the resources identified in the control message correspond to the overlapping portion.

Example 3: A method, apparatus, system, and non-transitory computer-readable medium of Examples 1 to 2, wherein the control message includes a starting resource and a length of resources of the resources unavailable for downlink transmission.

Example 4: A method, apparatus, system, and non-transitory computer-readable medium of Examples 1 to 3, wherein the determining that the overlapping portion consists of resources unavailable for downlink transmission comprises receiving an indication that the first frequency portion of the slot for uplink communication, is at least a part of the resources unavailable for downlink transmission.

Example 5: A method, apparatus, system, and non-transitory computer-readable medium of Examples 1 to 4, further including receiving an indication that at least one guard band adjacent to the overlapping portion is also a part of the resources unavailable for downlink transmission.

Example 6: A method, apparatus, system, and non-transitory computer-readable medium of Examples 1 to 5, wherein the determining that the overlapping portion consists of resources unavailable for downlink transmission comprises determining that the overlapping portion corresponds to the first frequency portion of the slot for uplink communication.

Example 7: A method, apparatus, system, and non-transitory computer-readable medium of Examples 1 to 6, further including receiving a rate matching pattern corresponding to the first frequency portion of the slot for uplink communication, the rate matching pattern having a resource block group (RBG)-level granularity, wherein the determining that the overlapping portion consists of resources unavailable for downlink transmission includes determining that rate matching pattern corresponds to the overlapping portion.

Example 8: A method, apparatus, system, and non-transitory computer-readable medium of Examples 1 to 7, further including receiving information that defines one or more sets of resources that can be dynamically made available for downlink transmission; and receiving a dynamic indication that the defined one or more sets of resources are unavailable for downlink transmission in the slot, wherein the determining that the overlapping portion consists of resources unavailable for downlink transmission includes determining that the overlapping portion is at least part of the defined one or more sets of resources.

Example 9: A method, apparatus, system, and non-transitory computer-readable medium for receiving information indicating a slot format, the information identifying a first frequency portion of a slot for uplink (UL) communication and at least one other portion of the slot for downlink (DL) communication; receiving a DL resource allocation for the slot, the DL resource allocation comprising an overlapping portion where the DL resource allocation overlaps at least partially with the first frequency portion; determining that the overlapping portion comprises resources unavailable for DL transmission; and communicating over a wireless carrier utilizing the slot format while disregarding (e.g., ignoring) information related to the overlapping portion.

Example 10: A method, apparatus, system, and non-transitory computer-readable medium of Example 9, further including receiving a control message identifying resources corresponding to the first frequency portion, wherein the determining that the overlapping portion comprises resources unavailable for DL transmission includes: determining that the resources identified in the control message correspond to the overlapping portion.

Example 11: A method, apparatus, system, and non-transitory computer-readable medium of Examples 9 to 10, wherein the control message includes: a starting resource, and a length corresponding to the resources unavailable for DL transmission.

Example 12: A method, apparatus, system, and non-transitory computer-readable medium of Examples 9 to 11, wherein the determining that the overlapping portion comprises resources unavailable for DL transmission includes: receiving an indication that the first frequency portion comprises resources unavailable for DL transmission.

Example 13: A method, apparatus, system, and non-transitory computer-readable medium of Examples 9 to 12, wherein the determining that the overlapping portion comprises resources unavailable for DL transmission further includes: determining that at least one guard band adjacent to the overlapping portion comprises resources unavailable for DL transmission.

Example 14: A method, apparatus, system, and non-transitory computer-readable medium of Examples 9 to 13, wherein the determining that the overlapping portion comprises resources unavailable for DL transmission includes: determining that the overlapping portion corresponds to the first frequency portion.

Example 15: A method, apparatus, system, and non-transitory computer-readable medium of Examples 9 to 14, further including receiving a rate matching pattern corresponding to the first frequency portion, the rate matching pattern having a resource block group (RBG)-level granularity, wherein the determining that the overlapping portion comprises resources unavailable for DL transmission including: determining that the rate matching pattern corresponds to the overlapping portion.

Example 16: A method, apparatus, system, and non-transitory computer-readable medium of Examples 9 to 15, further including receiving information that defines one or more sets of resources configured for being dynamically made unavailable for DL transmission; and receiving an indication that the one or more sets of resources are unavailable for DL transmission, wherein the determining that the overlapping portion comprises resources unavailable for DL transmission includes: determining that the overlapping portion comprises the one or more sets of resources.

Example 17. A method, apparatus, system, and non-transitory computer-readable medium of wireless communication operable at a user equipment (UE), including: receiving information indicating a slot format, the information identifying a first frequency portion of a slot for uplink (UL) communication and at least one other portion of the slot for downlink (DL) communication; receiving a DL resource allocation for the slot, the DL resource allocation including an overlapping portion where the DL resource allocation overlaps at least partially with the first frequency portion; and communicating over a wireless carrier utilizing the slot format while disregarding information related to the overlapping portion.

Example 18. The method, apparatus, system, and non-transitory computer-readable medium of Example 17, wherein the communicating over the wireless carrier while disregarding the information related to the overlapping portion includes: determining that the overlapping portion of the DL resource allocation includes resources unavailable for DL transmission.

Example 19. The method, apparatus, system, and non-transitory computer-readable medium of Examples 17 to 18, further including: receiving a control message identifying a set of resources unavailable for DL transmission, wherein the control message includes: a starting resource of the set of resources, and a length corresponding to the set of resources unavailable for DL transmission, and wherein the communicating over the wireless carrier while disregarding the information related to the overlapping portion includes: determining that the overlapping portion of the DL resource allocation includes the set of resources unavailable for DL transmission.

Example 20. The method, apparatus, system, and non-transitory computer-readable medium of Examples 17 to 19, further including: receiving an indication that the first frequency portion includes resources unavailable for DL transmission, and wherein the communicating over the wireless carrier while disregarding the information related to the overlapping portion includes: determining that the overlapping portion of the DL resource allocation includes one or more resources of the first frequency portion.

Example 21. The method, apparatus, system, and non-transitory computer-readable medium of Examples 17 to 20, wherein the communicating over the wireless carrier while disregarding the information related to the overlapping portion includes: determining that at least one guard band adjacent to the overlapping portion includes resources unavailable for DL transmission; and determining that the overlapping portion includes one or more resources of the at least one guard band.

Example 22. The method, apparatus, system, and non-transitory computer-readable medium of Examples 17 to 21, wherein the communicating over the wireless carrier while disregarding the information related to the overlapping portion includes: determining that the overlapping portion corresponds to one or more resources of the first frequency portion.

Example 23. The method, apparatus, system, and non-transitory computer-readable medium of Examples 17 to 22, further including: receiving a rate matching pattern corresponding to the first frequency portion, the rate matching pattern having a resource block group (RBG)-level granularity, and wherein the communicating over the wireless carrier while disregarding the information related to the overlapping portion includes: determining that the overlapping portion corresponds to the rate matching pattern.

Example 24. The method, apparatus, system, and non-transitory computer-readable medium of Examples 17 to 23, further including: receiving information that defines one or more sets of resources configured for being dynamically made unavailable for DL transmission; and receiving an indication that the one or more sets of resources are unavailable for DL transmission, wherein the communicating over the wireless carrier while disregarding the information related to the overlapping portion includes: determining that the overlapping portion includes the one or more sets of resources.

Example 25. A method, apparatus, system, and non-transitory computer-readable medium of wireless communication operable at a base station (BS), including: determining at least one first frequency portion of a slot as being available for uplink (UL) communication, and at least one second frequency portion of the slot as being available for downlink (DL) communication, wherein the at least one first frequency portion of the slot is unavailable for DL communication; transmitting information indicative of the at least one first frequency portion of the slot and the at least one second frequency portion of the slot; transmitting a DL resource allocation to a user equipment (UE), the DL resource allocation including an overlapping portion where the DL resource allocation overlaps at least partially with the at least one first frequency portion of the slot; and utilizing the slot to communicate over a wireless carrier with the UE.

Example 26. The method, apparatus, system, and non-transitory computer-readable medium of Example 25, wherein the wireless carrier includes a sub-band full-duplex (SBFD) wireless carrier.

Example 27. The method, apparatus, system, and non-transitory computer-readable medium of Examples 25 to 26, wherein the at least one first frequency portion corresponds to a first bandwidth part (BWP), and the at least one second frequency portion corresponds to a second bandwidth part (BWP).

Example 28. The method, apparatus, system, and non-transitory computer-readable medium of Examples 25 to 27, wherein the transmitting of the information indicative of the at least one first frequency portion of the slot and the at least one second frequency portion of the slot includes: transmitting a control message identifying a set of resources unavailable for DL transmission, the set of resources corresponding to the at least one first frequency portion of the slot.

Example 29. The method, apparatus, system, and non-transitory computer-readable medium of Example 28, wherein the control message includes: a starting resource of the set of resources, and a length corresponding to the set of resources unavailable for DL transmission.

Example 30. The method, apparatus, system, and non-transitory computer-readable medium of Examples 25 to 29, wherein the DL resource allocation includes a type 1 DL resource allocation.

Example 31. The method, apparatus, system, and non-transitory computer-readable medium of Examples 25 to 30, wherein the transmitting of the information indicative of the at least one first frequency portion of the slot and the at least one second frequency portion of the slot includes: transmitting an indication that the at least one first frequency portion includes resources unavailable for DL transmission.

Example 32. The method, apparatus, system, and non-transitory computer-readable medium of Example 31, wherein the indication that the at least one first frequency portion includes resources unavailable for DL transmission includes that at least one guard band portion adjacent the at least one first frequency portion includes at least a portion of the resources unavailable for DL transmission.

Example 33. An apparatus for wireless communication, including: means for receiving information indicating a slot format, the information identifying a first frequency portion of a slot for uplink (UL) communication and at least one other portion of the slot for downlink (DL) communication; means for receiving a DL resource allocation for the slot, the DL resource allocation including an overlapping portion where the DL resource allocation overlaps at least partially with the first frequency portion; means for determining that the overlapping portion includes resources unavailable for DL transmission; and means for communicating over a wireless carrier utilizing the slot format while ignoring information related to the overlapping portion.

Example 34. The apparatus of Example 33, further including: means for receiving a control message identifying resources corresponding to the first frequency portion, wherein the means for determining that the overlapping portion includes resources unavailable for DL transmission include: means for determining that the resources identified in the control message correspond to the overlapping portion.

Example 35. The apparatus of Examples 33 to 34, wherein the control message includes: a starting resource, and a length corresponding to the resources unavailable for DL transmission.

Example 36. The apparatus of Examples 33 to 35, wherein the means for determining that the overlapping portion includes resources unavailable for DL transmission include: means for receiving an indication that the first frequency portion includes resources unavailable for DL transmission.

Example 37. The apparatus of Examples 33 to 36, wherein the means for determining that the overlapping portion includes resources unavailable for DL transmission include: means for determining that at least one guard band of the slot includes resources unavailable for DL transmission.

Example 38. The apparatus of Examples 33 to 37, wherein the means for determining that the overlapping portion includes resources unavailable for DL transmission include: means for identifying that the first frequency portion includes resources unavailable for DL transmission; and means for determining that the overlapping portion corresponds to the first frequency portion.

Example 39. The apparatus of Examples 33 to 38, further including: means for receiving a rate matching pattern corresponding to the first frequency portion, the rate matching pattern having a resource block group (RBG)-level granularity, wherein the means for determining that the overlapping portion includes resources unavailable for DL transmission include: means for determining that the rate matching pattern corresponds to the overlapping portion.

Example 40. The apparatus of Examples 33 to 39, further including: means for identifying one or more sets of resources configured for being dynamically made unavailable for DL transmission; and means for receiving an indication that the one or more sets of resources are unavailable for DL transmission, wherein the means for determining that the overlapping portion includes resources unavailable for DL transmission include: means for determining that the overlapping portion includes the one or more sets of resources.

Example 41. A non-transitory computer-readable medium storing computer-executable code, including instructions for causing a user equipment (UE) to: receive information indicating a slot format, the information identifying a first frequency portion of a slot for uplink (UL) communication and at least one other portion of the slot for downlink (DL) communication; receive a DL resource allocation for the slot, the DL resource allocation including an overlapping portion where the DL resource allocation overlaps at least partially with the first frequency portion; determine that the overlapping portion includes resources unavailable for DL transmission; and communicate over a wireless carrier utilizing the slot format while ignoring information received in the overlapping portion.

Example 42. The non-transitory computer-readable medium of Example 41, wherein the computer-executable code further includes instructions for causing the UE to: receive a control message identifying resources corresponding to the first frequency portion, wherein causing the UE to determine that the overlapping portion includes resources unavailable for DL transmission, the instructions are configured to cause the UE to: determine that the resources identified in the control message correspond to the overlapping portion.

Example 43. The non-transitory computer-readable medium of Examples 41 to 42, wherein the control message includes: a starting resource, and a length corresponding to the resources unavailable for DL transmission.

Example 44. The non-transitory computer-readable medium of Examples 41 to 43, wherein for causing the UE to determine that the overlapping portion includes resources unavailable for DL transmission, the instructions are configured to cause the UE to: receive an indication that the first frequency portion includes resources unavailable for DL transmission.

Example 45. The non-transitory computer-readable medium of Examples 41 to 44, wherein the computer-executable code further includes instructions for causing the UE to: determine that at least one guard band adjacent to the overlapping portion includes resources unavailable for DL transmission.

Example 46. The non-transitory computer-readable medium of Examples 41 to 45, wherein, for causing the UE to determine that the overlapping portion includes resources unavailable for DL transmission, the instructions are configured to cause the UE to: determine that the overlapping portion corresponds to the first frequency portion.

Example 47. The non-transitory computer-readable medium of Examples 41 to 46, wherein the computer-executable code further includes instructions for causing the UE to: receive a rate matching pattern corresponding to the first frequency portion, the rate matching pattern having a resource block group (RBG)-level granularity, wherein for causing the UE to determine that the overlapping portion includes resources unavailable for DL transmission, the instructions are configured to cause the UE to: determine that the rate matching pattern corresponds to the overlapping portion.

Example 48. The non-transitory computer-readable medium of Examples 41 to 48, wherein the computer-executable code further includes instructions for causing the UE to: receive information that defines one or more sets of resources configured for being dynamically made unavailable for DL transmission; and receive an indication that the one or more sets of resources are unavailable for DL transmission, wherein, for causing the UE to determine that the overlapping portion includes resources unavailable for DL transmission, the instructions are configured to cause the UE to: determine that the overlapping portion includes the one or more sets of resources.

This disclosure presents several aspects of a wireless communication network with reference to an exemplary implementation. The actual telecommunication standard, network architecture, and/or communication standard employed will depend on the specific application and the overall design constraints imposed on the system. NR is an emerging wireless communications technology under development. As those skilled in the art will readily appreciate, various aspects described throughout this disclosure may be extended to other telecommunication systems, network architectures and communication standards.

By way of example, the various aspects of this disclosure may be implemented within systems defined by, and/or described in documents from, an organization named "3rd Generation Partnership Project" (3GPP), such as LTE, as well as others including the Evolved Packet System (EPS) and/or the Universal Mobile Telecommunication System (UMTS). Various aspects may also be extended to systems defined by, and/or described in documents from, an organization named the 3rd Generation Partnership Project 2 (3GPP2). Other examples may be implemented within systems employing IEEE 802.11 (Wi-Fi), IEEE 802.16 (WiMAX), IEEE 802.20, Ultra-Wideband (UWB), Bluetooth, and/or other suitable systems. It should be noted that the terms "network" and "system" are often used interchangeably.

In some examples, a CDMA network may implement a radio technology such as Universal Terrestrial Radio Access (UTRA), which includes Wideband CDMA (WCDMA) as well as other variants. A TDMA network may implement a radio technology such as Global System for Mobile Communications (GSM). An OFDMA network may implement a radio technology such as NR (e.g., 5G NR), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A, UMB, and GSM are described in 3GPP documents.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b (a-b); a and c (a-c); b and c (b-c); and a, b and c (a-b-c), as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information, such as a reference signal), accessing (e.g., accessing data in a memory) and the like. Also, "determining" may include resolving, selecting, choosing, establishing and the like.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of the disclosed technology may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

It is to be understood that the claims are not limited to the precise configuration and components illustrated above. Various modifications, changes and variations may be made in the arrangement, operation and details of the methods and apparatus described herein without departing from the scope of the claims. The description of the disclosed technology is provided to enable those skilled in the art to practice the various aspects described herein. The claims, however, are not intended to be limited to the aspects shown herein, but are to be accorded the full scope consistent with the language of the claims. Various modifications to these aspects will be readily apparent to those skilled in the art, and the generic principles defined herein may be applied to other aspects.

What is claimed is:

1. A method of wireless communication operable at a user equipment (UE), comprising:
   receiving, from a base station (BS), information indicating a slot format, the information identifying a first frequency portion of a slot for uplink (UL) communication and at least one other portion of the slot for downlink (DL) communication;
   receiving, from the BS, a DL resource allocation for the slot, the DL resource allocation comprising an overlapping portion where the DL resource allocation overlaps at least partially with the first frequency portion; and
   communicating with the BS over a wireless carrier utilizing the slot format while disregarding information related to the overlapping portion, the communicating with the BS over the wireless carrier comprising:
      determining that at least one guard band adjacent to the overlapping portion comprises resources unavailable for DL transmission, and
      determining that the overlapping portion comprises one or more resources of the at least one guard band.

2. The method of claim 1, wherein the communicating over the wireless carrier while disregarding the information related to the overlapping portion comprises:
   determining that the overlapping portion of the DL resource allocation comprises the resources unavailable for DL transmission.

3. The method of claim 1, further comprising:
   receiving, from the BS or another entity, a control message identifying the resources unavailable for DL transmission, wherein the control message comprises: a starting resource of the resources, and a length corresponding to the resources unavailable for DL transmission, and
   wherein the communicating over the wireless carrier while disregarding the information related to the overlapping portion comprises:
      determining that the overlapping portion of the DL resource allocation comprises the resources unavailable for DL transmission.

4. The method of claim 1, further comprising:
   receiving, from the B S, an indication that the first frequency portion comprises the resources unavailable for DL transmission, and
   wherein the communicating over the wireless carrier while disregarding the information related to the overlapping portion comprises:
      determining that the overlapping portion of the DL resource allocation comprises one or more resources of the first frequency portion.

5. The method of claim 1, wherein the communicating over the wireless carrier while disregarding the information related to the overlapping portion comprises:
   determining that the overlapping portion corresponds to one or more resources of the first frequency portion.

6. The method of claim 1, further comprising:
   receiving, from the BS, a rate matching pattern corresponding to the first frequency portion, the rate matching pattern having a resource block group (RBG)-level granularity, and wherein the communicating over the wireless carrier while disregarding the information related to the overlapping portion comprises:
    determining that the overlapping portion corresponds to the rate matching pattern.

7. The method of claim 1, further comprising:
    receiving, from the BS, information that defines one or more sets of resources configured for being dynamically made unavailable for DL transmission; and
    receiving, from the BS, an indication that the one or more sets of resources are unavailable for DL transmission,
    wherein the communicating over the wireless carrier while disregarding the information related to the overlapping portion comprises:
        determining that the overlapping portion comprises the one or more sets of resources.

8. A method of wireless communication operable at a base station (BS), comprising:
    determining at least one first frequency portion of a slot as being available for uplink (UL) communication, and at least one second frequency portion of the slot as being available for downlink (DL) communication, wherein the at least one first frequency portion of the slot is unavailable for DL communication;
    transmitting, to a user equipment (UE), information indicative of the at least one first frequency portion of the slot and the at least one second frequency portion of the slot, the transmitting of the information comprising transmitting, to the UE, an indication that the at least one first frequency portion comprises resources unavailable for DL transmission, the indication including that at least one guard band portion adjacent the at least one first frequency portion comprises at least a portion of the resources unavailable for DL transmission;
    transmitting a DL resource allocation to the UE, the DL resource allocation comprising an overlapping portion where the DL resource allocation overlaps at least partially with the at least one first frequency portion of the slot; and
    utilizing the slot to communicate over a wireless carrier with the UE.

9. The method of claim 8, wherein the wireless carrier comprises a sub-band full-duplex (SBFD) wireless carrier.

10. The method of claim 8, wherein the at least one first frequency portion corresponds to a first bandwidth part (BWP), and the at least one second frequency portion corresponds to a second bandwidth part (BWP).

11. The method of claim 8, wherein the transmitting of the information indicative of the at least one first frequency portion of the slot and the at least one second frequency portion of the slot comprises:
    transmitting, to the UE, a control message identifying the resources unavailable for DL transmission, the resources corresponding to the at least one first frequency portion of the slot.

12. The method of claim 11, wherein the control message comprises: a starting resource of the resources, and a length corresponding to the set of resources unavailable for DL transmission.

13. The method of claim 8, wherein the DL resource allocation comprises a type 1 DL resource allocation.

14. An apparatus for wireless communication, comprising:
    one or more processors,
    one or more transceivers communicatively coupled to the one or more processors; and
    one or more memories communicatively coupled to the one or more processors,
    wherein the one or more processors are individually or collectively configured to:
        determine at least one first frequency portion of a slot as being available for uplink (UL) communication, and at least one second frequency portion of the slot as being available for downlink (DL) communication, wherein the at least one first frequency portion of the slot is unavailable for DL communication;
        transmit, via the one or more transceivers and to a user equipment (UE), information indicative of the at least one first frequency portion of the slot and the at least one second frequency portion of the slot, the transmitting of the information comprising transmitting, to the UE, an indication that the at least one first frequency portion comprises resources unavailable for DL transmission, the indication including that at least one guard band portion adjacent the at least one first frequency portion comprises at least a portion of the resources unavailable for DL transmission;
        transmit a DL resource allocation to the UE, the DL resource allocation comprising an overlapping portion where the DL resource allocation overlaps at least partially with the at least one first frequency portion of the slot; and
        utilize the slot to communicate over a wireless carrier with the UE.

15. The apparatus of claim 14, wherein the wireless carrier comprises a sub-band full-duplex (SBFD) wireless carrier.

16. The apparatus of claim 14, wherein the at least one first frequency portion corresponds to a first bandwidth part (BWP), and the at least one second frequency portion corresponds to a second bandwidth part (BWP).

17. The apparatus of claim 14, wherein to transmit the information indicative of the at least one first frequency portion of the slot and the at least one second frequency portion of the slot, the one or more processors are individually or collectively configured to:
    transmit, to the UE, a control message identifying the resources unavailable for DL transmission, the resources corresponding to the at least one first frequency portion of the slot.

18. The apparatus of claim 17, wherein the control message comprises: a starting resource of the resources, and a length corresponding to the resources unavailable for DL transmission.

19. The apparatus of claim 18, wherein the DL resource allocation comprises a type 1 DL resource allocation.

20. An apparatus for wireless communication, comprising:
    one or more processors,
    one or more transceivers communicatively coupled to the one or more processors; and
    one or more memories communicatively coupled to the one or more processors,
    wherein the one or more processors are individually or collectively configured to:
        receive, from a base station (BS), information indicating a slot format, the information identifying a first frequency portion of a slot for uplink (UL) communication and at least one other portion of the slot for downlink (DL) communication;
        receive, via the one or more transceivers and from the BS, a DL resource allocation for the slot, the DL resource allocation comprising an overlapping portion where the DL resource allocation overlaps at least partially with the first frequency portion;

receive, via the one or more transceivers and from the BS, an indication that at least one guard band adjacent to the overlapping portion comprises resources unavailable for DL transmission; and communicate, via the one or more transceivers and with the BS, over a wireless carrier utilizing the slot format while disregarding information related to the overlapping portion, the communicating comprising determining that the overlapping portion of the DL resource allocation comprises one or more resources of the at least one guard band.

21. The apparatus of claim 20, wherein to communicate over the wireless carrier while disregarding the information related to the overlapping portion, the one or more processors are individually or collectively configured to:

determine that the overlapping portion of the DL resource allocation comprises the resources unavailable for DL transmission.

22. The apparatus of claim 20, wherein the one or more processors are individually or collectively further configured to:

receive, from the BS or another entity, a control message identifying the resources unavailable for DL transmission, wherein the control message comprises: a start indication corresponding to a starting resource of the resources, and a length indication corresponding to the resources unavailable for DL transmission, and wherein to communicate over the wireless carrier while disregarding the information related to the overlapping portion, the one or more processors are individually or collectively configured to:

determine that the overlapping portion of the DL resource allocation comprises the resources unavailable for DL transmission.

23. The apparatus of claim 20, wherein to communicate over the wireless carrier while disregarding the information related to the overlapping portion, the one or more processors are individually or collectively configured to:

determine that the overlapping portion corresponds to one or more resources of the first frequency portion.

24. The apparatus of claim 20, wherein the one or more processors are individually or collectively further configured to:

receive, via the one or more transceivers and from the BS, a rate matching pattern corresponding to the first frequency portion, the rate matching pattern comprising a resource block group (RBG)-level granularity; and wherein to communicate over the wireless carrier while disregarding the information related to the overlapping portion, the one or more processors are individually or collectively configured to:

determine that the overlapping portion corresponds to the rate matching pattern.

25. The apparatus of claim 20, wherein the one or more processors are individually or collectively further configured to:

identify one or more sets of resources in the slot format configured for being dynamically made available for DL transmission; and receive, via the one or more transceivers and from the BS, a dynamic indication that the one or more sets of resources are unavailable for DL transmission, wherein to communicate over the wireless carrier while disregarding the information related to the overlapping portion, the one or more processors are individually or collectively configured to:

determine that the overlapping portion comprises the one or more sets of resources.

* * * * *